US012008265B2

(12) United States Patent
Malik et al.

(10) Patent No.: US 12,008,265 B2
(45) Date of Patent: Jun. 11, 2024

(54) QUALITY-OF-SERVICE INFORMATION FOR A MULTI-MEMORY SYSTEM

(71) Applicant: Micron Technology, Inc., Boise, ID (US)

(72) Inventors: Saira Samar Malik, Lafayette, IN (US); Sahil Soi, Bengaluru (IN); Taeksang Song, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 190 days.

(21) Appl. No.: 17/648,400

(22) Filed: Jan. 19, 2022

(65) Prior Publication Data

US 2022/0357889 A1      Nov. 10, 2022

Related U.S. Application Data

(60) Provisional application No. 63/184,404, filed on May 5, 2021.

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC .... G06F 3/0659; G06F 3/0604; G06F 3/0679; G06F 3/061; G06F 3/611; G06F 3/0655; G06F 3/0658; G06F 13/18; G06F 13/1694; G06F 12/0888
See application file for complete search history.

(56) References Cited

U.S. PATENT DOCUMENTS

| | | | |
|---|---|---|---|
| 2008/0106967 A1* | 5/2008 | Oh | G11C 11/419 365/230.06 |
| 2013/0086288 A1* | 4/2013 | Lakshmanamurthy | G06F 13/364 710/113 |
| 2016/0328156 A1* | 11/2016 | Swarbrick | G06F 13/4234 |
| 2020/0125277 A1* | 4/2020 | Greco | G06F 3/0659 |
| 2021/0096750 A1* | 4/2021 | Balakrishnan | G06F 3/0611 |
| 2022/0317924 A1* | 10/2022 | Shen | G06F 3/0659 |

* cited by examiner

*Primary Examiner* — Tracy A Warren
(74) *Attorney, Agent, or Firm* — Holland & Hart LLP

(57) ABSTRACT

Methods, systems, and devices for quality-of-service information for a multi-memory system are described. An interface controller may receive a first command from a host device during a set of clock cycles. The first command may be received over a command bus that includes a pin, such as a command select pin configured for double data rate signaling. The interface controller may decode the first command based on a state of the command select pin during at least one clock cycle of the set of clock cycles. And the interface controller may determine quality-of-service information for a second command based on decoding the first command and on information, such as a plurality of bits, included in the first command.

20 Claims, 8 Drawing Sheets

QUALITY-OF-SERVICE INFORMATION FOR A MULTI-MEMORY SYSTEM

CROSS REFERENCE

The present Application for Patent claims the benefit of U.S. Provisional Patent Application No. 63/184,404 by MALIK et al., entitled "QUALITY-OF-SERVICE INFORMATION FOR A MULTI-MEMORY SYSTEM," filed May 5, 2021, assigned to the assignee hereof, and expressly incorporated by reference in its entirety herein.

FIELD OF TECHNOLOGY

The following relates generally to one or more systems for memory and more specifically to quality-of-service information for a multi-memory device.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state if disconnected from an external power source.

DETAILED DESCRIPTION

A device, such as an electronic device, may include a non-volatile memory (e.g., a primary memory for storing information among other operations) and a volatile memory (e.g., a secondary memory) that may operate as a cache for the non-volatile memory. Such a configuration may allow the device to benefit from advantages of the non-volatile memory (e.g., non-volatility and persistent storage, high storage capacity, low power consumption) while maintaining compatibility with a host device through the volatile memory, among other aspects. To support this type of configuration, a device may include an interface controller that interfaces with the host device on behalf of the volatile memory and the non-volatile memory. In some examples, the host device may prioritize the communication of certain commands with the interface controller. However, the prioritization of the commands may be lost at the interface controller based on the commands not indicating the prioritization or based on aspects of performance at the interface controller, which may result in lower priority commands being executed before higher priority commands.

According to the techniques described herein, an interface controller may improve the performance of a device by prioritizing commands based on or in response to quality-of-service (QoS) information received from a host device. The techniques may allow the interface controller to use an interface (e.g., a DRAM interface) that is compatible with a protocol (e.g., a low power double data rate (LPDDR) protocol) supported by the host device and the volatile memory, among other advantages. By accounting for or performing actions based on the QoS information the interface controller may be able to correctly prioritize commands as intended by the host device while also accounting for interface controller operations or other constraints or conditions that would otherwise influence or change a prioritization of the commands.

Features of the disclosure are initially described in the context of a systems and a memory subsystem described with reference to FIGS. 1 and 2. Features of the disclosure are described in the context of a system as described with reference to FIG. 3, and a process flow, as described with reference to FIG. 4. These and other features of the disclosure are further illustrated by and described with reference to an apparatus diagram and flowcharts that relate to quality-of-service information for a multi-memory system as described with reference to FIGS. 5-8.

Figure 1:
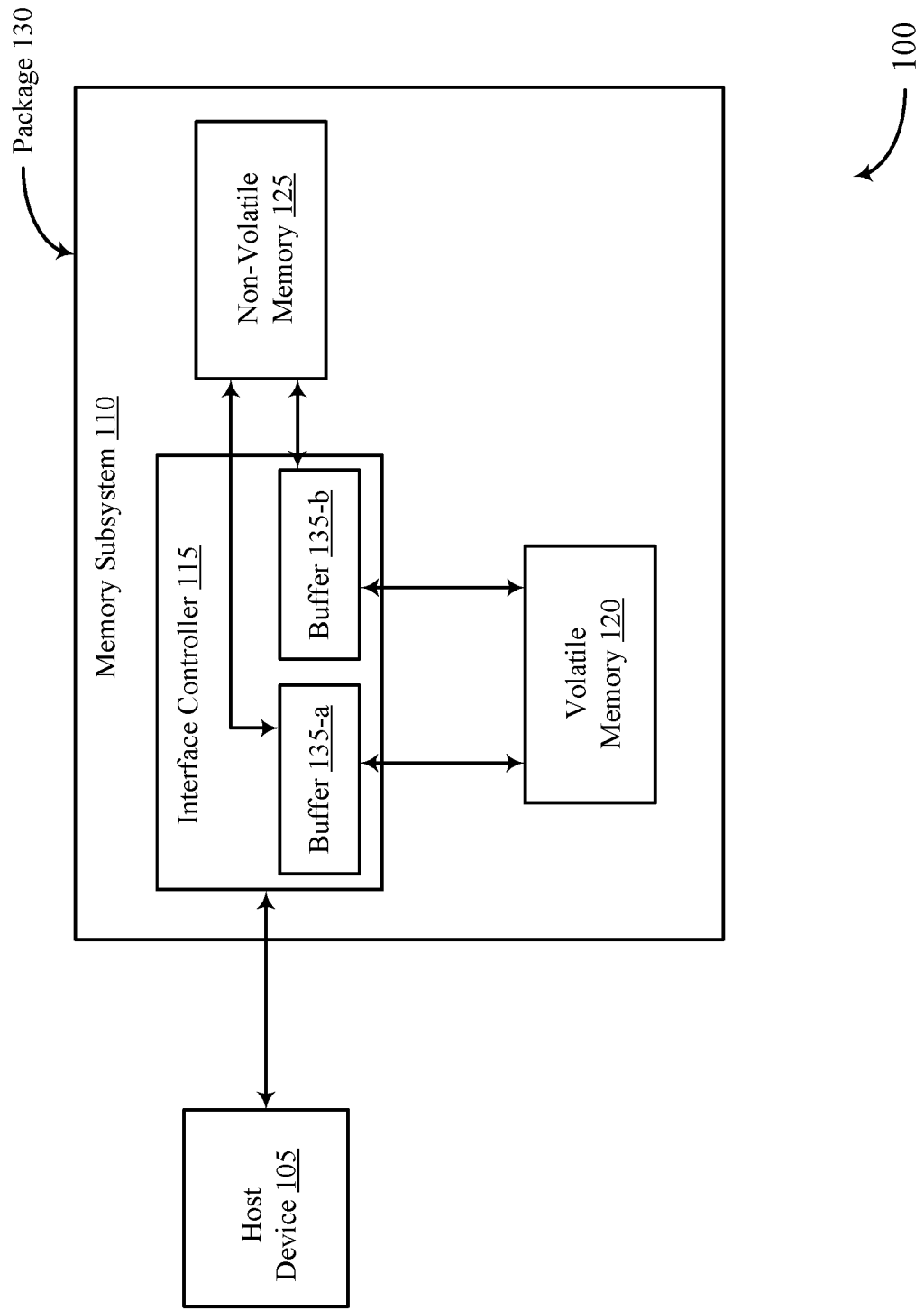
FIG. 1 illustrates an example of a system that supports quality-of-service information in accordance with examples as disclosed herein.

FIG. 1 illustrates an example of a system 100 that supports quality-of-service information in accordance with examples as disclosed herein. The system 100 may be included in an electronic device such a computer or phone. The system 100 may include a host device 105 and a memory subsystem 110. The host device 105 may be a processor or system-on-a-chip (SoC) that interfaces with the interface controller 115 as well as other components of the electronic device that includes the system 100. The memory subsystem 110 may store and provide access to electronic information (e.g., digital information, data) for the host device 105. The memory subsystem 110 may include an interface controller 115, a volatile memory 120, and a non-volatile memory 125. In some examples, the interface controller 115, the volatile memory 120, and the non-volatile memory 125 may be included in a same physical package such as a package 130. However, the interface controller 115, the volatile memory 120, and the non-volatile memory 125 may be disposed on different, respective dies (e.g., silicon dies).

The devices in the system 100 may be coupled by various conductive lines (e.g., traces, printed circuit board (PCB) routing, redistribution layer (RDL) routing) that may enable the communication of information (e.g., commands, addresses, data) between the devices. The conductive lines may make up channels, data buses, command buses, address buses, and the like.

The memory subsystem 110 may be configured to provide the benefits of the non-volatile memory 125 while maintaining compatibility with a host device 105 that supports protocols for a different type of memory, such as the volatile memory 120, among other examples. For example, the non-volatile memory 125 may provide benefits (e.g., relative to the volatile memory 120) such as non-volatility, higher capacity, or lower power consumption. But the host device 105 may be incompatible or inefficiently configured with various aspects of the non-volatile memory 125. For instance, the host device 105 may support voltages, access latencies, protocols, page sizes, etc. that are incompatible with the non-volatile memory 125. To compensate for the incompatibility between the host device 105 and the non-volatile memory 125, the memory subsystem 110 may be configured with the volatile memory 120, which may be compatible with the host device 105 and serve as a cache for the non-volatile memory 125. Thus, the host device 105 may use protocols supported by the volatile memory 120 while benefitting from the advantages of the non-volatile memory 125.

In some examples, the system 100 may be included in, or coupled with, a computing device, electronic device, mobile computing device, or wireless device. The device may be a portable electronic device. For example, the device may be a computer, a laptop computer, a tablet computer, a smart-phone, a cellular phone, a wearable device, an internet-connected device, or the like. In some examples, the device may be configured for bi-directional wireless communication via a base station or access point. In some examples, the device associated with the system 100 may be capable of machine-type communication (MTC), machine-to-machine (M2M) communication, or device-to-device (D2D) communication. In some examples, the device associated with the system 100 may be referred to as a user equipment (UE), station (STA), mobile terminal, or the like.

The host device 105 may be configured to interface with the memory subsystem 110 using a first protocol (e.g., low-power double data rate (LPDDR)) supported by the interface controller 115. Thus, the host device 105 may, in some examples, interface with the interface controller 115 directly and the non-volatile memory 125 and the volatile memory 120 indirectly. In alternative examples, the host device 105 may interface directly with the non-volatile memory 125 and the volatile memory 120. The host device 105 may also interface with other components of the electronic device that includes the system 100. The host device 105 may be or include an SoC, a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components. In some examples, the host device 105 may be referred to as a host.

The interface controller 115 may be configured to interface with the volatile memory 120 and the non-volatile memory 125 on behalf of the host device 105 (e.g., based on or in response to one or more commands or requests issued by the host device 105). For instance, the interface controller 115 may facilitate the retrieval and storage of data in the volatile memory 120 and the non-volatile memory 125 on behalf of the host device 105. Thus, the interface controller 115 may facilitate data transfer between various subcomponents, such as between at least some of the host device 105, the volatile memory 120, or the non-volatile memory 125. The interface controller 115 may interface with the host device 105 and the volatile memory 120 using the first protocol and may interface with the non-volatile memory 125 using a second protocol supported by the non-volatile memory 125.

The non-volatile memory 125 may be configured to store digital information (e.g., data) for the electronic device that includes the system 100. Accordingly, the non-volatile memory 125 may include an array or arrays of memory cells and a local memory controller configured to operate the array(s) of memory cells. In some examples, the memory cells may be or include FeRAM cells (e.g., the non-volatile memory 125 may be FeRAM). The non-volatile memory 125 may be configured to interface with the interface controller 115 using the second protocol that is different than the first protocol used between the interface controller 115 and the host device 105. In some examples, the non-volatile memory 125 may have a longer latency for access operations than the volatile memory 120. For example, retrieving data from the non-volatile memory 125 may take longer than retrieving data from the volatile memory 120. Similarly, writing data to the non-volatile memory 125 may take longer than writing data to the volatile memory 120. In some examples, the non-volatile memory 125 may have a smaller page size than the volatile memory 120, as described herein.

The volatile memory 120 may be configured to operate as a cache for one or more components, such as the non-volatile memory 125. For example, the volatile memory 120 may store information (e.g., data) for the electronic device that includes the system 100. Accordingly, the volatile memory 120 may include an array or arrays of memory cells and a local memory controller configured to operate the array(s) of memory cells. In some examples, the memory cells may be or include DRAM cells (e.g., the volatile memory may be DRAM). The non-volatile memory 125 may be configured to interface with the interface controller 115 using the first protocol that is used between the interface controller 115 and the host device 105.

In some examples, the volatile memory 120 may have a shorter latency for access operations than the non-volatile memory 125. For example, retrieving data from the volatile memory 120 may take less time than retrieving data from the non-volatile memory 125. Similarly, writing data to the volatile memory 120 may take less time than writing data to the non-volatile memory 125. In some examples, the volatile memory 120 may have a larger page size than the non-volatile memory 125. For instance, the page size of volatile memory 120 may be 2 kilobytes (2 kB) and the page size of non-volatile memory 125 may be 64 bytes (64 B) or 128 bytes (128 B).

Although the non-volatile memory 125 may be a higher-density memory than the volatile memory 120, accessing the non-volatile memory 125 may take longer than accessing the volatile memory 120 (e.g., due to different architectures and protocols, among other reasons). Accordingly, operating the volatile memory 120 as a cache may reduce latency in the system 100. As an example, an access request for data from the host device 105 may be satisfied relatively quickly by retrieving the data from the volatile memory 120 rather than from the non-volatile memory 125. To facilitate operation of the volatile memory 120 as a cache, the interface controller 115 may include multiple buffers 135. The buffers 135 may be disposed on the same die as the interface controller 115 and may be configured to temporarily store data for transfer between the volatile memory 120, the non-volatile memory 125, or the host device 105 (or any combination thereof) during one or more access operations (e.g., storage and retrieval operations).

An access operation may also be referred to as an access process or access procedure and may involve one or more sub-operations that are performed by one or more of the components of the memory subsystem 110. Examples of access operations may include storage operations in which data provided by the host device 105 is stored (e.g., written to) in the volatile memory 120 or the non-volatile memory 125 (or both), and retrieval operations in which data requested by the host device 105 is obtained (e.g., read) from the volatile memory 120 or the non-volatile memory 125 and is returned to the host device 105.

To store data in the memory subsystem 110, the host device 105 may initiate a storage operation (or "storage process") by transmitting a storage command (also referred to as a storage request, a write command, or a write request) to the interface controller 115. The storage command may target a set of non-volatile memory cells in the non-volatile memory 125. In some examples, a set of memory cells may also be referred to as a portion of memory. The host device 105 may also provide the data to be written to the set of non-volatile memory cells to the interface controller 115. The interface controller 115 may temporarily store the data in the buffer 135-a. After storing the data in the buffer 135-a, the interface controller 115 may transfer the data from the buffer 135-a to the volatile memory 120 or the non-volatile memory 125 or both. In write-through mode, the interface controller 115 may transfer the data to both the volatile memory 120 and the non-volatile memory 125. In write-back mode, the interface controller 115 may simply transfer the data to the volatile memory 120 (with the data being transferred to the non-volatile memory 125 during a later eviction process).

In either mode, the interface controller 115 may identify an appropriate set of one or more volatile memory cells in the volatile memory 120 for storing the data associated with the storage command. To do so, the interface controller 115 may implement set-associative mapping in which each set of one or more non-volatile memory cells in the non-volatile memory 125 may be mapped to multiple sets (e.g., rows) of volatile memory cells in the volatile memory 120. For instance, the interface controller 115 may implement n-way associative mapping which allows data from a set of non-volatile memory cells to be stored in one of n sets of volatile memory cells in the volatile memory 120. Thus, the interface controller 115 may manage the volatile memory 120 as a cache for the non-volatile memory 125 by referencing the n sets of volatile memory cells associated with a targeted set of non-volatile memory cells. As used herein, a "set" of objects may refer to one or more of the objects unless otherwise described or noted. Although described with reference to set-associative mapping, the interface controller 115 may manage the volatile memory 120 as a cache by implementing one or more other types of mapping such as direct mapping or associative mapping, among other examples.

After determining which n sets of volatile memory cells are associated with the targeted set of non-volatile memory cells, the interface controller 115 may store the data in one or more of the n sets of volatile memory cells. This way, a subsequent (e.g., following) retrieval command from the host device 105 for the data can be efficiently satisfied by retrieving the data from the lower-latency volatile memory 120 instead of retrieving the data from the higher-latency non-volatile memory 125. The interface controller 115 may determine which of the n sets of the volatile memory 120 store the data based on or in response to one or more parameters associated with the data stored in the n sets of the volatile memory 120, such as the validity, age, or modification status of the data. Thus, a storage command by the host device 105 may be wholly (e.g., in write-back mode) or partially (e.g., in write-through mode) satisfied by storing the data in the volatile memory 120. To track the data stored in the volatile memory 120, the interface controller 115 may store for one or more sets of volatile memory cells (e.g., for each set of volatile memory cells) a tag address that indicates the non-volatile memory cells with data stored in a given set of volatile memory cells.

To retrieve data from the memory subsystem 110, the host device 105 may initiate a retrieval operation (also referred to as a retrieval process) by transmitting a retrieval command (also referred to as a retrieval request, a read command, or a read request) to the interface controller 115. The retrieval command may target a set of one or more non-volatile memory cells in the non-volatile memory 125. Upon receiving the retrieval command, the interface controller 115 may check for the requested data in the volatile memory 120. For instance, the interface controller 115 may check for the requested data in the n sets of volatile memory cells associated with the targeted set of non-volatile memory cells. If one of the n sets of volatile memory cells stores the requested data (e.g., stores data for the targeted set of non-volatile memory cells), the interface controller 115 may transfer the data from the volatile memory 120 to the buffer 135-a (e.g., in response to determining whether or that one of the n sets of volatile memory cells stores the requested data, as described in FIGS. 4 and 5) so that it can be transmitted to the host device 105.

In general, the term "hit" may be used to refer to the scenario where the volatile memory 120 stores data targeted by the host device 105. If then sets of one or more volatile memory cells do not store the requested data (e.g., the n sets of volatile memory cells store data for a set of non-volatile memory cells other than the targeted set of non-volatile memory cells), the interface controller 115 may transfer the requested data from the non-volatile memory 125 to the buffer 135-a (e.g., in response to determining whether or that the n sets of volatile memory cells do not store the requested data, as described with reference to FIGS. 4 and 5) so that it can be transmitted to the host device 105. In general, the term "miss" may be used to refer to the scenario where the volatile memory 120 does not store data targeted by the host device 105.

In a miss scenario, after transferring the requested data to the buffer 135-a, the interface controller 115 may transfer the requested data from the buffer 135-a to the volatile memory 120 so that subsequent read requests for the data can be satisfied by the volatile memory 120 instead of the non-volatile memory 125. For example, the interface controller 115 may store the data in one of the n sets of volatile memory cells associated with the targeted set of non-volatile memory cells. But the n sets of volatile memory cells may already be storing data for other sets of non-volatile memory cells. So, to preserve this other data, the interface controller 115 may transfer the other data to the buffer 135-*b* so that it can be transferred to the non-volatile memory 125 for storage. Such a process may be referred to as "eviction" and the data transferred from the volatile memory 120 to the buffer 135-*b* may be referred to as "victim" data.

In some cases, the interface controller 115 may transfer a subset of the victim data from the buffer 135-*b* to the non-volatile memory 125. For example, the interface controller 115 may transfer one or more subsets of victim data that have changed since the data was initially stored in the non-volatile memory 125. Data that is inconsistent between the volatile memory 120 and the non-volatile memory 125 (e.g., due to an update in one memory and not the other) may be referred to in some cases as "modified" or "dirty" data. In some examples (e.g., if interface controller operates in one mode such as a write-back mode), dirty data may be data that is present in the volatile memory 120 but not present in the non-volatile memory 125.

So, the interface controller 115 may perform an eviction procedure to save data from the volatile memory 120 to the non-volatile memory 125 if the volatile memory 120 is full (e.g., to make space for new data in the volatile memory 120). In some examples, the interface controller 115 may perform a "fill" procedure in which data from the non-volatile memory 125 is saved to the volatile memory 120. The interface controller 115 may perform a fill procedure in the event of a miss (e.g., to populate the volatile memory 120 with relevant data). For example, in the event of a read miss, which occurs if a read command from the host device 105 targets data stored in the non-volatile memory 125 instead of the volatile memory 120, the interface controller 115 may retrieve (from the non-volatile memory 125) the data requested by the read command and, in addition to returning the data to the host device, store the data in the volatile memory 120 (e.g., so that the data can be retrieved quickly in the future).

Thus, the memory subsystem 110 may satisfy (or "fulfill") requests (e.g., read commands, write commands) from the host device 105 using either the volatile memory 120 or the non-volatile memory 125, depending on the hit or miss status of the request. For example, in the event of a read miss, the read command from the host device 105 may be satisfied by the non-volatile memory 125, which means that the data returned from the host device 105 may originate from the non-volatile memory 125. And in the event of a read hit, the read command from the host device 105 may be satisfied by the volatile memory 120, which means that the data returned from the host device 105 may originate from the volatile memory 120. In some examples, the ratio of hits to misses ("hit-to-miss ratio") may be relatively high (e.g., the hit percentage (or "hit rate") may be around 85% whereas the miss percentage (or "miss rate") may be around 15%).

In some examples, the interface controller 115 may include an interface (e.g., a DRAM interface) that is compatible with a protocol (e.g., an LPDDR protocol) supported by the host device 105 and the volatile memory 120. But, in some examples, the interface may not include any pins for or dedicated to the signaling of QoS information. According to the techniques described herein, the host device 105 may indicate QoS information for functional commands (e.g., read commands, write commands) to the interface controller. For example, the host device 105 may indicate QoS information for functional commands by including (e.g., embedding) the QoS information in other commands for the memory subsystem 110. QoS information may also be referred to as priority information, service information, or other suitable terminology and may indicate a priority level, a service expectation, or a latency tolerance for a corresponding functional command, among other examples.

The system 100 may include any quantity of non-transitory computer readable media that support quality-of-service information as described herein. For example, the host device 105, the interface controller 115, the volatile memory 120, or the non-volatile memory 125 may include or otherwise may access one or more non-transitory computer readable media storing instructions (e.g., firmware) for performing the functions ascribed herein to the host device 105, the interface controller 115, the volatile memory 120, or the non-volatile memory 125. For example, such instructions, if executed by the host device 105 (e.g., by a host device controller), by the interface controller 115, by the volatile memory 120 (e.g., by a local controller), or by the non-volatile memory 125 (e.g., by a local controller), may cause the host device 105, the interface controller 115, the volatile memory 120, or the non-volatile memory 125 to perform associated functions as described herein.

Figure 2:
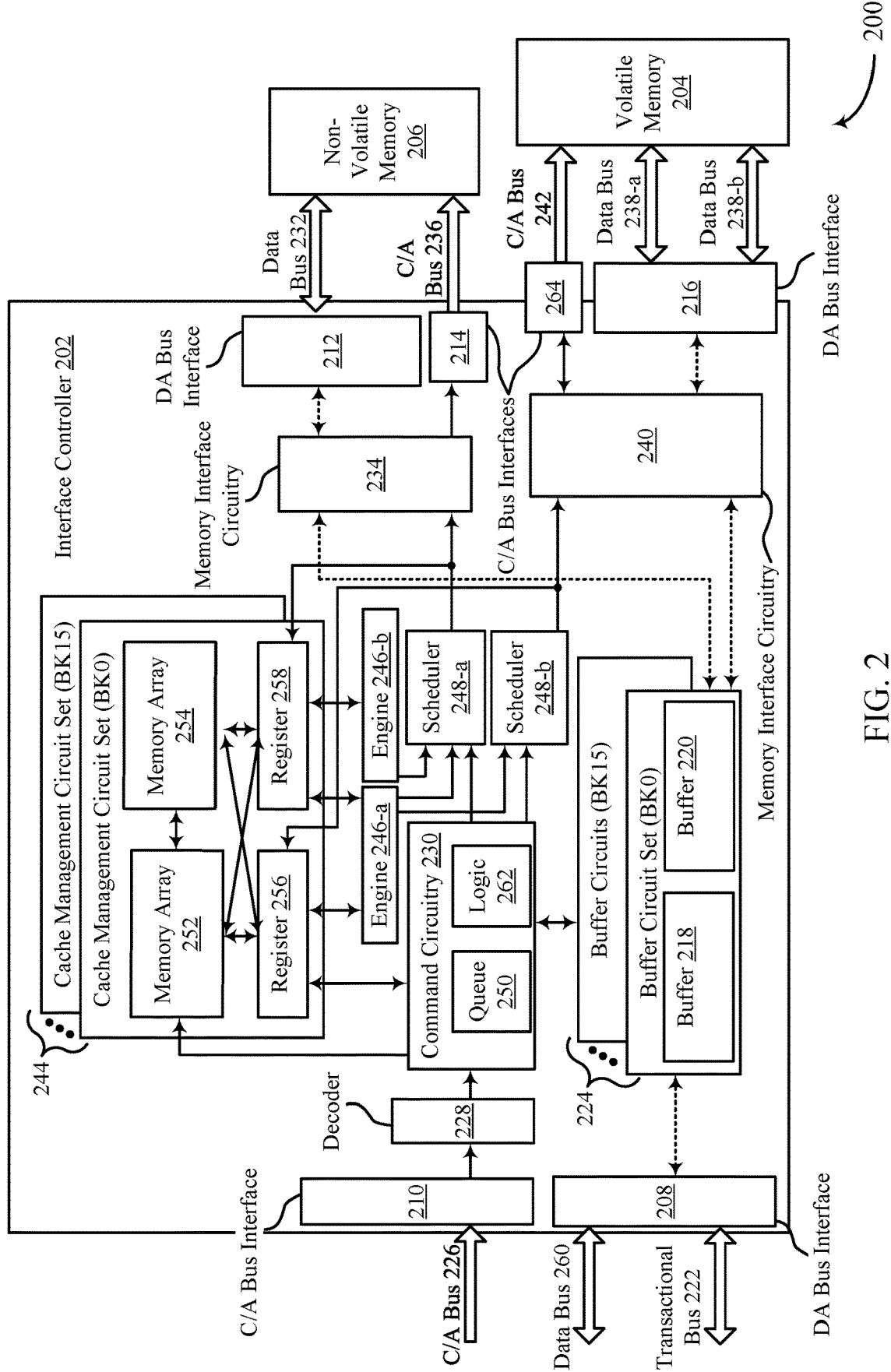
FIG. 2 illustrates an example of a memory die that supports quality-of-service information for a multi-memory device in accordance with examples as disclosed herein.

FIG. 2 illustrates an example of a memory subsystem 200 that supports quality-of-service information in accordance with examples as disclosed herein. The memory subsystem 200 may be an example of the memory subsystem 110 described with reference to FIG. 1. Accordingly, the memory subsystem 200 may interact with a host device as described with reference to FIG. 1. The memory subsystem 200 may include an interface controller 202, a volatile memory 204, and a non-volatile memory 206, which may be examples of the interface controller 115, the volatile memory 120, and the non-volatile memory 125, respectively, as described with reference to FIG. 1. Thus, the interface controller 202 may interface with the volatile memory 204 and the non-volatile memory 206 on behalf of the host device as described with reference to FIG. 1. For example, the interface controller 202 may operate the volatile memory 204 as a cache for the non-volatile memory 206. Operating the volatile memory 204 as the cache may allow subsystem to provide the benefits of the non-volatile memory 206 (e.g., non-volatile, high-density storage) while maintaining compatibility with a host device that supports a different protocol than the non-volatile memory 206.

In FIG. 2, dashed lines between components represent the flow of data or communication paths for data and solid lines between components represent the flow of commands or communication paths for commands. In some cases, the memory subsystem 200 is one of multiple similar or identical subsystems that may be included in an electronic device. Each subsystem may be referred to as a slice and may be associated with a respective channel of a host device in some examples.

The non-volatile memory 206 may be configured to operate as a main memory (e.g., memory for long-term data storage) for a host device. In some cases, the non-volatile memory 206 may include one or more arrays of FeRAM cells. Each FeRAM cell may include a selection component and a ferroelectric capacitor and may be accessed by applying appropriate voltages to one or more access lines such as word lines, plates lines, and digit lines. In some examples, a subset of FeRAM cells coupled with to an activated word line may be sensed, for example concurrently or simultaneously, without having to sense all FeRAM cells coupled with the activated word line. Accordingly, a page size for an FeRAM array may be different than (e.g., smaller than) a DRAM page size. In the context of a memory device, a page may refer to the memory cells in a row (e.g., a group of the memory cells that have a common row address) and a page size may refer to the quantity of memory cells or column addresses in a row, or the quantity of column addresses accessed during an access operation. Alternatively, a page size may refer to a size of data handled by various interfaces or the amount of data a row is capable of storing. In some cases, different memory device types may have different page sizes. For example, a DRAM page size (e.g., 2 kB) may be a superset of a non-volatile memory (e.g., FeRAM) page size (e.g., 64 B).

A smaller page size of an FeRAM array may provide various efficiency benefits, as an individual FeRAM cell may need more power to read or write than an individual DRAM cell. For example, a smaller page size for an FeRAM array may facilitate effective energy usage because a smaller quantity of FeRAM cells may be activated if an associated change in information is minor. In some examples, the page size for an array of FeRAM cells may vary, for example dynamically (e.g., during operation of the array of FeRAM cells) depending on the nature of data and command utilizing FeRAM operation.

Although an individual FeRAM cell may need more power to read or write than an individual DRAM cell, an FeRAM cell may maintain a stored logic state for an extended period of time in the absence of an external power source, as the ferroelectric material in the FeRAM cell may maintain a non-zero electric polarization in the absence of an electric field. Therefore, including an FeRAM array in the non-volatile memory 206 may provide power and efficiency benefits relative to volatile memory cells (e.g., DRAM cells in the volatile memory 204), as it may reduce or eliminate constraints to perform refresh operations.

The volatile memory 204 may be configured to operate as a cache for the non-volatile memory 206. In some cases, the volatile memory 204 may include one or more arrays of DRAM cells. Each DRAM cell may include a capacitor that includes a dielectric material to store a charge representative of the programmable state. The memory cells of the volatile memory 204 may be logically grouped or arranged into one or more memory banks (as referred to herein as "banks"). For example, volatile memory 204 may include sixteen banks. The memory cells of a bank may be arranged in a grid or an array of intersecting columns and rows and each memory cell may be accessed or refreshed by applying appropriate voltages to the digit line (e.g., column line) and word line (e.g., row line) for that memory cell. The rows of a bank may be referred to pages, and the page size may refer to the quantity of columns or memory cells in a row (and thus, the amount of data a row is capable of storing). As noted, the page size of the volatile memory 204 may be different than (e.g., larger than) the page size of the non-volatile memory 206.

The interface controller 202 may include various circuits for interfacing (e.g., communicating) with other devices, such as a host device, the volatile memory 204, and the non-volatile memory 206. For example, the interface controller 202 may include a data (DA) bus interface 208, a command and address (C/A) bus interface 210, a data bus interface 212, a C/A bus interface 214, a data bus interface 216, and a C/A bus interface 264. The data bus interfaces may support the communication of information using one or more communication protocols. For example, the data bus interface 208, the C/A bus interface 210, the data bus interface 216, and the C/A bus interface 264 may support information that is communicated using a first protocol (e.g., LPDDR signaling), whereas the data bus interface 212 and the C/A bus interface 214 may support information communicated using a second protocol. Thus, the various bus interfaces coupled with the interface controller 202 may support different amounts of data or data rates.

The data bus interface 208 may be coupled with the data bus 260, the transactional bus 222, and the buffer circuitry 224. The data bus interface 208 may be configured to transmit and receive data over the data bus 260 and control information (e.g., acknowledgements/negative acknowledgements) or metadata over the transactional bus 222. The data bus interface 208 may also be configured to transfer data between the data bus 260 and the buffer circuitry 224. The data bus 260 and the transactional bus 222 may be coupled with the interface controller 202 and the host device such that a conductive path is established between the interface controller 202 and the host device. In some examples, the pins of the transactional bus 222 may be referred to as data mask inversion (DMI) pins. Although shown with one data bus 260 and one transactional bus 222, there may be any quantity of data buses 260 and any quantity of transactional buses 222 coupled with one or more data bus interfaces 208.

The C/A bus interface 210 may be coupled with the C/A bus 226 and the decoder 228. The C/A bus interface 210 may be configured to transmit and receive commands and addresses over the C/A bus 226. The commands and addresses received over the C/A bus 226 may be associated with data received or transmitted over the data bus 260. The C/A bus interface 210 may also be configured to transmit commands and addresses to the decoder 228 so that the decoder 228 can decode the commands and relay the decoded commands and associated addresses to the command circuitry 230.

The data bus interface 212 may be coupled with the data bus 232 and the memory interface circuitry 234. The data bus interface 212 may be configured to transmit and receive data over the data bus 232, which may be coupled with the non-volatile memory 206. The data bus interface 212 may also be configured to transfer data between the data bus 232 and the memory interface circuitry 234. The C/A bus interface 214 may be coupled with the C/A bus 236 and the memory interface circuitry 234. The C/A bus interface 214 may be configured to receive commands and addresses from the memory interface circuitry 234 and relay the commands and the addresses to the non-volatile memory 206 (e.g., to a local controller of the non-volatile memory 206) over the C/A bus 236. The commands and the addresses transmitted over the C/A bus 236 may be associated with data received or transmitted over the data bus 232. The data bus 232 and the C/A bus 236 may be coupled with the interface controller 202 and the non-volatile memory 206 such that conductive paths are established between the interface controller 202 and the non-volatile memory 206.

The data bus interface 216 may be coupled with the data buses 238 (e.g., data bus 238-a, data bus 238-b) and the memory interface circuitry 240. The data bus interface 216 may be configured to transmit and receive data over the data buses 238, which may be coupled with the volatile memory 204. The data bus interface 216 may also be configured to transfer data between the data buses 238 and the memory interface circuitry 240. The C/A bus interface 264 may be coupled with the C/A bus 242 and the memory interface circuitry 240. The C/A bus interface 264 may be configured to receive commands and addresses from the memory interface circuitry 240 and relay the commands and the addresses to the volatile memory 204 (e.g., to a local controller of the volatile memory 204) over the C/A bus 242. The commands and addresses transmitted over the C/A bus 242 may be associated with data received or transmitted over the data buses 238. The data bus 238 and the C/A bus 242 may be coupled with the interface controller 202 and the volatile memory 204 such that conductive paths are established between the interface controller 202 and the volatile memory 204.

In addition to buses and bus interfaces for communicating with coupled devices, the interface controller 202 may include circuitry for operating the non-volatile memory 206 as a main memory and the volatile memory 204 as a cache. For example, the interface controller 202 may include command circuitry 230, buffer circuitry 224, cache management circuitry 244, one or more engines 246, and one or more schedulers 248.

The command circuitry 230 may be coupled with the buffer circuitry 224, the decoder 228, the cache management circuitry 244, and the schedulers 248, among other components. The command circuitry 230 may be configured to receive command and address information from the decoder 228 and store the command and address information in the queue 250. The command circuitry 230 may include logic 262 that processes command information (e.g., from a host device) and storage information from other components (e.g., the cache management circuitry 244, the buffer circuitry 224) and uses that information to generate one or more commands for the schedulers 248. The command circuitry 230 may also be configured to transfer address information (e.g., address bits) to the cache management circuitry 244. In some examples, the logic 262 may be a circuit configured to operate as a finite state machine (FSM).

The buffer circuitry 224 may be coupled with the data bus interface 208, the command circuitry 230, the memory interface circuitry 234, and the memory interface circuitry 234. The buffer circuitry 224 may include a set of one or more buffer circuits for at least some banks, if not each bank, of the volatile memory 204. The buffer circuitry 224 may also include components (e.g., a memory controller) for accessing the buffer circuits. In one example, the volatile memory 204 may include sixteen banks and the buffer circuitry 224 may include sixteen sets of buffer circuits. Each set of the buffer circuits may be configured to store data from or for (or both) a respective bank of the volatile memory 204. As an example, the buffer circuit set for bank 0 (BK0) may be configured to store data from or for (or both) the first bank of the volatile memory 204 and the buffer circuit for bank 15 (BK15) may be configured to store data from or for (or both) the sixteenth bank of the volatile memory 204.

Each set of buffer circuits in the buffer circuitry 224 may include a pair of buffers. The pair of buffers may include one buffer (e.g., an open page data (OPD) buffer) configured to store data targeted by an access command (e.g., a write command or read command) from the host device and another buffer (e.g., a victim page data (VPD) buffer) configured to store data for an eviction process that results from the access command. For example, the buffer circuit set for BK0 may include the buffer 218 and the buffer 220, which may be examples of buffer 135-a and 135-b, respectively. The buffer 218 may be configured to store BK0 data that is targeted by an access command from the host device. And the buffer 220 may be configured to store data that is transferred from BK0 as part of an eviction process triggered by the access command. Each buffer in a buffer circuit set may be configured with a size (e.g., storage capacity) that corresponds to a page size of the volatile memory 204. For example, if the page size of the volatile memory 204 is 2 kB, the size of each buffer may be 2 kB. Thus, the size of the buffer may be equivalent to the page size of the volatile memory 204 in some examples.

The cache management circuitry 244 may be coupled with the command circuitry 230, the engines 246, and the schedulers 248, among other components. The cache management circuitry 244 may include a cache management circuit set for one or more banks (e.g., each bank) of volatile memory. As an example, the cache management circuitry 244 may include sixteen cache management circuit sets for BK0 through BK15. Each cache management circuit set may include two memory arrays that may be configured to store storage information for the volatile memory 204. As an example, the cache management circuit set for BK0 may include a memory array 252 (e.g., a Cache DRAM (CDRAM) Tag Array (CDT-TA)) and a memory array 254 (e.g., a CDRAM Valid (CDT-V) array), which may be configured to store storage information for BK0. The memory arrays may also be referred to as arrays or buffers in some examples. In some cases, the memory arrays may be or include volatile memory cells, such as static RAM (SRAM) cells.

Storage information (or "metadata") may include content information, validity information, or dirty information (or any combination thereof) associated with the volatile memory 204, among other examples. Content information (which may also be referred to as tag information or address information) may indicate which data is stored in a set of volatile memory cells. For example, the content information (e.g., a tag address) for a row of the volatile memory 204 may indicate which set of one or more non-volatile memory cells currently has data stored in the row. As noted, validity information may indicate whether the data stored in a set of volatile memory cells is actual data (e.g., data having an intended order or form) or placeholder data (e.g., data being random or dummy, not having an intended or important order). And dirty information may indicate whether the data stored in a set of one or more volatile memory cells of the volatile memory 204 is different than corresponding data stored in a set of one or more non-volatile memory cells of the non-volatile memory 206. For example, dirty information may indicate whether data stored in a set of volatile memory cells has been updated relative to data stored in the non-volatile memory 206.

The memory array 252 may include memory cells that store storage information (e.g., tag information, validity information, dirty information) for an associated bank (e.g., BK0) of the volatile memory 204. The storage information may be stored on a per-row basis (e.g., there may be respective storage information for each row of the associated non-volatile memory bank). The interface controller 202 may check for requested data in the volatile memory 204 by referencing the storage information in the memory array 252. For instance, the interface controller 202 may receive, from a host device, a retrieval command for data in a set of non-volatile memory cells in the non-volatile memory 206. The interface controller 202 may use a set of one or more address bits (e.g., a set of row address bits) targeted by the access request to reference the storage information in the memory array 252. For instance, using set-associative mapping, the interface controller 202 may reference the content information in the memory array 252 to determine which set of volatile memory cells, if any, stores the requested data.

In addition to storing content information for volatile memory cells, the memory array 252 may also store validity information that indicates whether the data in a set of volatile memory cells is actual data (also referred to as valid data) or random data (also referred to as invalid data). For example, the volatile memory cells in the volatile memory 204 may initially store random data and continue to do so until the volatile memory cells are written with data from a host device or the non-volatile memory 206. To track which data is valid, the memory array 252 may be configured to set a bit for each set (e.g., row) of volatile memory cells if actual data is stored in that set of volatile memory cells. This bit may be referred to a validity bit or a validity flag. As with the content information, the validity information stored in the memory array 252 may be stored on a per-row basis. Thus, each validity bit may indicate the validity of data stored in an associated row in some examples.

In some examples, the memory array 252 may store dirty information that indicates whether a set (e.g., row) of volatile memory cells stores any dirty data. Like the validity information, the dirty information stored in the memory array 252 may be stored on a per-row basis.

The memory array 254 may be similar to the memory array 252 and may also include memory cells that store storage information for a bank (e.g., BK0) of the volatile memory 204 that is associated with the memory array 252. For example, the memory array 254 may store validity information and dirty information for a bank of the volatile memory 204. However, the storage information stored in the memory array 254 may be stored on a sub-block basis as opposed to a per-row basis. For example, the validity information stored in the memory cells of the memory array 254 may indicate the validity of data for subsets of volatile memory cells in a row of the volatile memory 204.

As an example, the validity information in the memory array 254 may indicate the validity of each subset (e.g., 32 B or 64 B) of data stored in row of BK0 of the volatile memory 204. Similarly, the dirty information stored in the memory cells of the memory array 254 may indicate which subsets of volatile memory cells in a row of the volatile memory 204 store dirty data. For instance, the dirty information in the memory array 254 may indicate the dirty status of each subset (e.g., 32 B or 64 B) of data stored in row of BK0 of the volatile memory 204. Storing storage information (e.g., tag information, validity information) on a per-row basis in the memory array 252 may allow the interface controller 202 to determine whether there is a hit or whether there is a miss for data in the volatile memory 204. Storing storage information (e.g., validity information, dirty information) on a sub-block basis in the memory array 254 may allow the interface controller 202 to determine which one or more subsets of data to return to the host device (e.g., during a retrieval process) and which one or more subsets of data to preserve in the non-volatile memory 206 (e.g., during an eviction process).

Each cache management circuit set may also include a respective pair of registers coupled with the command circuitry 230, the engines 246, the memory interface circuitry 234, the memory interface circuitry 240, and the memory arrays for that cache management circuit set, among other components. For example, a cache management circuit set may include a first register (e.g., a register 256 which may be an open page tag (OPT) register) configured to receive storage information (e.g., one or more bits of tag information, validity information, or dirty information, other information, or any combination) from the memory array 252 or the scheduler 248-b or both. The cache management circuitry set may also include a second register (e.g., a register 258 which may be a victim page tag (VPT) register) configured to receive storage information (e.g., validity information or dirty information or both) from the memory array 254 and the scheduler 248-a or both. The information in the register 256 and the register 258 may be transferred to the command circuitry 230 and the engines 246 to enable decision-making by these components. For example, the command circuitry 230 may issue commands for reading the non-volatile memory 206 or the volatile memory 204 based on or in response to storage information in the register 256, or the register 258, or both.

The engine 246-a may be coupled with the register 256, the register 258, and the schedulers 248. The engine 246-a may be configured to receive storage information from various components and issue commands to the schedulers 248 based on the storage information. For example, if the interface controller 202 is in a first mode such as a write-through mode, the engine 246-a may issue commands to the scheduler 248-b and in response the scheduler 248-b to initiate or facilitate the transfer of data from the buffer 218 to both the volatile memory 204 and the non-volatile memory 206. Alternatively, if the interface controller 202 is in a second mode such as a write-back mode, the engine 246-a may issue commands to the scheduler 248-b and in response the scheduler 248-b may initiate or facilitate the transfer of data from the buffer 218 to the volatile memory 204. In the event of a write-back operation, the data stored in the volatile memory 204 may eventually be transferred to the non-volatile memory 206 during a subsequent (e.g., following) eviction process.

The engine 246-b may be coupled with the register 258 and the scheduler 248-a. The engine 246-b may be configured to receive storage information from the register 258 and issue commands to the scheduler 248-a based on the storage information. For instance, the engine 246-b may issue commands to the scheduler 248-a to initiate or facilitate transfer of dirty data from the buffer 220 to the non-volatile memory 206 (e.g., as part of an eviction process). If the buffer 220 holds a set of data transferred from the volatile memory 204 (e.g., victim data), the engine 246-b may indicate which one or more subsets (e.g., which 64 B) of the set of data in the buffer 220 should be transferred to the non-volatile memory 206.

The scheduler 248-a may be coupled with various components of the interface controller 202 and may facilitate accessing the non-volatile memory 206 by issuing commands to the memory interface circuitry 234. The commands issued by the scheduler 248-a may be based on or in response to commands from the command circuitry 230, the engine 246-a, the engine 246-b, or a combination of these components. Similarly, the scheduler 248-b may be coupled with various components of the interface controller 202 and may facilitate accessing the volatile memory 204 by issuing commands to the memory interface circuitry 240. The commands issued by the scheduler 248-b may be based on or in response to commands from the command circuitry 230 or the engine 246-a, or both.

The memory interface circuitry 234 may communicate with the non-volatile memory 206 via one or more of the data bus interface 212 and the C/A bus interface 214. For example, the memory interface circuitry 234 may prompt the C/A bus interface 214 to relay commands issued by the memory interface circuitry 234 over the C/A bus 236 to a local controller in the non-volatile memory 206. And the memory interface circuitry 234 may transmit to, or receive data from, the non-volatile memory 206 over the data bus 232. In some examples, the commands issued by the memory interface circuitry 234 may be supported by the non-volatile memory 206 but not the volatile memory 204 (e.g., the commands issued by the memory interface circuitry 234 may be different than the commands issued by the memory interface circuitry 240).

The memory interface circuitry 240 may communicate with the volatile memory 204 via one or more of the data bus interface 216 and the C/A bus interface 264. For example, the memory interface circuitry 240 may prompt the C/A bus interface 264 to relay commands issued by the memory interface circuitry 240 over the C/A bus 242 to a local controller of the volatile memory 204. And the memory interface circuitry 240 may transmit to, or receive data from, the volatile memory 204 over one or more data buses 238. In some examples, the commands issued by the memory interface circuitry 240 may be supported by the volatile memory 204 but not the non-volatile memory 206 (e.g., the commands issued by the memory interface circuitry 240 may be different than the commands issued by the memory interface circuitry 234).

Together, the components of the interface controller 202 may operate the non-volatile memory 206 as a main memory and the volatile memory 204 as a cache. Such operation may be prompted by one or more access commands (e.g., read/retrieval commands/requests and write/storage commands/requests) received from a host device.

In some examples, the interface controller 202 may receive a storage command from the host device. The storage command may be received over the C/A bus 226 and transferred to the command circuitry 230 via one or more of the C/A bus interface 210 and the decoder 228. The storage command may include or be accompanied by address bits that target a memory address of the non-volatile memory 206. The data to be stored may be received over the data bus 260 and transferred to the buffer 218 via the data bus interface 208. In a write-through mode, the interface controller 202 may transfer the data to both the non-volatile memory 206 and the volatile memory 204. In a write-back mode, in some example, the interface controller 202 may transfer the data to only the volatile memory 204.

In either mode, the interface controller 202 may first check to see if the volatile memory 204 has space in memory cells available to store the data. To do so, the command circuitry 230 may reference the memory array 252 (e.g., using a set of the memory address bits) to determine whether one or more of the n sets (e.g., row) of volatile memory cells associated with the memory address are empty (e.g., store random or invalid data) or whether one or more of the n sets (e.g., row) of volatile memory cells associated with the memory address are full (e.g., store valid data). For example, the command circuitry 230 may determine whether one or more of the n sets (e.g., rows) of volatile memory cells is available (or is unavailable) based on tag information and validity information stored in the memory array 252. In some cases, a set of volatile memory cells in the volatile memory 204 may be referred to as a line, cache line, or row.

If one of the n associated sets of volatile memory cells is available for storing information, the interface controller 202 may transfer the data from the buffer 218 to the volatile memory 204 for storage in that set of volatile memory cells. But if no associated sets of volatile memory cells are empty, the interface controller 202 may initiate an eviction process to make room for the data in the volatile memory 204. The eviction process may involve transferring the victim data from one of the n associated sets of volatile memory cells to the buffer 220. The dirty information for the victim data may be transferred from the memory array 254 to the register 258 for identification of dirty subsets of the victim data. After the victim data is stored in the buffer 220, the new data can be transferred from the buffer 218 to the volatile memory 204 and the victim data can be transferred from the buffer 220 to the non-volatile memory 206. In some cases, dirty subsets of the old data may be transferred to the non-volatile memory 206 and clean subsets (e.g., unmodified subsets) may be discarded. The dirty subsets may be identified by the engine 246-b based on or in response to dirty information transferred from the memory array 254 to the register 258 during the eviction process.

In another example, the interface controller 202 may receive a command, such as a retrieval command, from the host device. The retrieval command may be received over the C/A bus 226 and transferred to the command circuitry 230 via one or more of the C/A bus interface 210 and the decoder 228. The retrieval command may include address bits that target a memory address of the non-volatile memory 206. Before attempting to access the targeted memory address of the non-volatile memory 206, the interface controller 202 may check to see if the volatile memory 204 stores the data. To do so, the command circuitry 230 may reference the memory array 252 (e.g., using a set of the memory address bits) to determine whether one or more of the n sets (e.g., rows) of volatile memory cells associated with the memory address stores the requested data (e.g., whether one or more of the n sets of volatile memory cells associated with the memory address stores the requested data or alternatively do not store the requested data). If the requested data is stored in the volatile memory 204, the interface controller 202 may transfer the requested data to the buffer 218 for transmission to the host device over the data bus 260.

If the requested data is not stored in the volatile memory 204 (e.g., the requested data may be stored in the non-volatile memory 206 or another location), the interface controller 202 may retrieve the data from the non-volatile memory 206 and transfer the data to the buffer 218 for transmission to the host device over the data bus 260. Additionally, the interface controller 202 may transfer the requested data from the buffer 218 to the volatile memory 204 so that the data can be accessed with a lower latency during a subsequent retrieval operation. Before transferring the requested data, however, the interface controller 202 may first determine whether one or more of the n associated sets of volatile memory cells is available to store the requested data (e.g., whether one or more of the n associated sets of volatile memory cells is empty or is full). The interface controller 202 may determine the availability of the n associated sets of volatile memory cells by communicating with the related cache management circuit set. If an associated set of volatile memory cells is available, the interface controller 202 may transfer the data in the buffer 218 to the volatile memory 204 without performing an eviction process. Otherwise, the interface controller 202 may transfer the data from the buffer 218 to the volatile memory 204 after performing an eviction process.

The memory subsystem 200 may be implemented in one or more configurations, including one-chip versions and multi-chip versions. A multi-chip version may include one or more constituents of the memory subsystem 200, including the interface controller 202, the volatile memory 204, and the non-volatile memory 206 (among other constituents or combinations of constituents), on a chip that is separate from a chip that includes one or more other constituents of the memory subsystem 200. For example, in one multi-chip version, respective separate chips may include each of the interface controller 202, the volatile memory 204, and the non-volatile memory 206. In contrast, a one-chip version may include the interface controller 202, the volatile memory 204, and the non-volatile memory 206 on a single chip.

In some examples, the C/A bus interface 210 may be configured to be compatible with a protocol supported by the host device 105 and the volatile memory 120. But the C/A bus interface 210 may not include any pins for (e.g., dedicated to) the signaling of QoS information. According to the techniques described herein, the host device 105 may indicate QoS information for functional commands (e.g., read commands, write commands) by including (e.g., embedding) the QoS information in other commands for the memory subsystem 110. To do so, in some examples, the host device may use a command select (CS) pin to indicate if a command carries QoS information (as opposed other control information) for a functional command, such as a subsequent functional command. Thus, the C/A bus interface 210 may be used to signal QoS information without modifying the pin structure of the C/A bus interface 210 in some examples, which modifying may otherwise impair or destroy compatibility with the protocol supported by the host device and the volatile memory 120.

Figure 3:
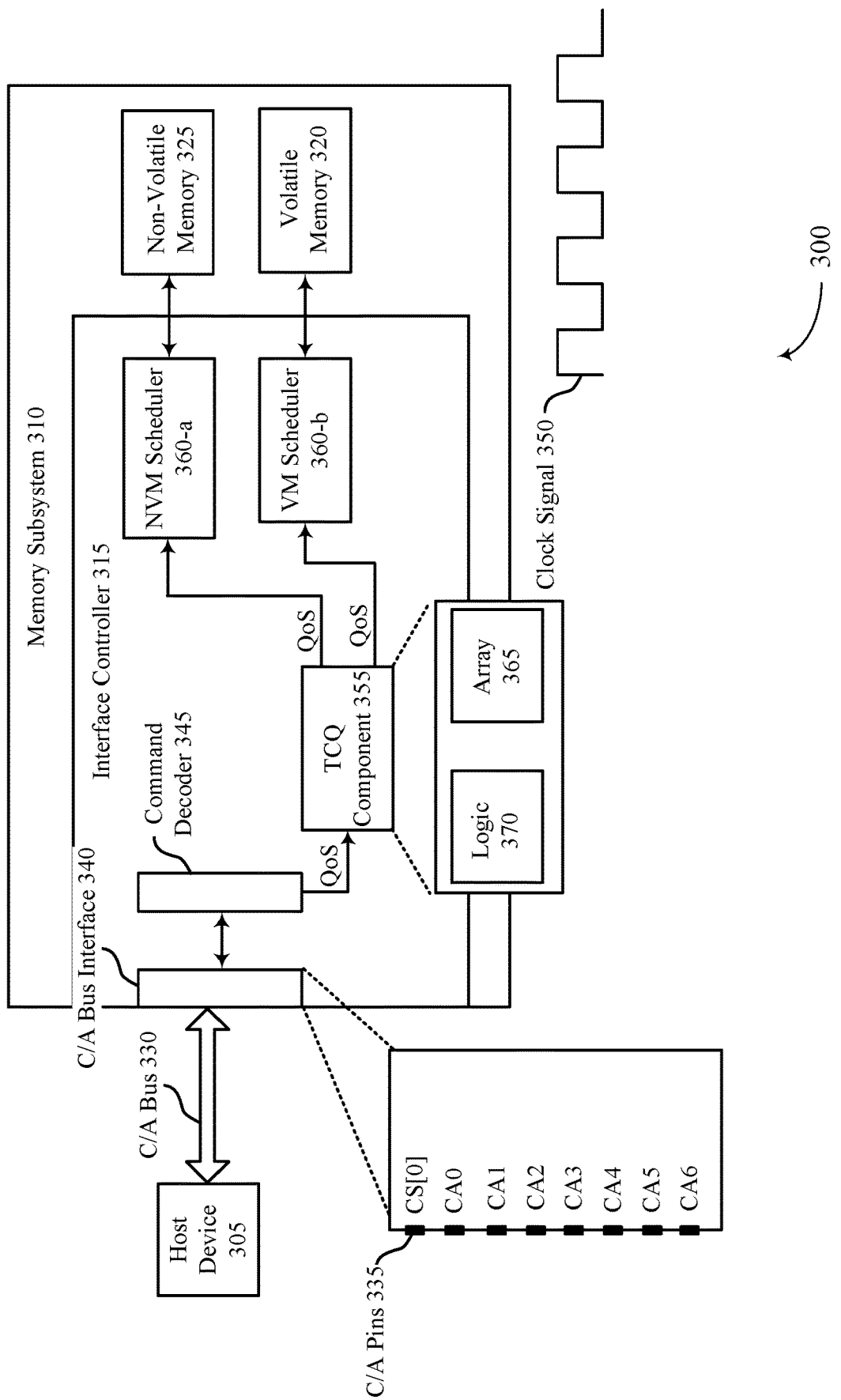
FIG. 3 illustrates an example of a memory subsystem that supports quality-of-service information in accordance with examples as disclosed herein.

FIG. 3 illustrates an example of a system 300 that supports quality-of-service information in accordance with examples as disclosed herein. The system 300 may include a host device 305 and a memory subsystem 310 and may be an example of a system 100 as described with reference to FIG. 1. The memory subsystem 310 may include an interface controller 315, a volatile memory 320, and a non-volatile memory 325, which may be coupled with one another via one or more transmission lines, buses, or both. As described herein, interface controller 315 may receive QoS information from the host device 305 and may use the QoS information to prioritize the issuance and execution of commands, as well as the return of requested data in some examples.

The interface controller 315 may receive commands and control information (e.g., addresses, QoS information) from the host device 305 over the C/A bus 330, which may be an example of the C/A bus 226. As described in more detail below, the interface controller 315 may receive commands as a series or sequence of voltages on the C/A pins 335, which may be included in the C/A bus interface 340. The C/A bus interface 340 may be an example of the C/A bus interface 210 and may be configured to support a protocol (e.g., a DDR protocol) used by the host device 305 and the volatile memory 320. The C/A bus interface 340 may transfer commands received from the host device 305 to the command decoder 345 so that the command can be decoded.

The command decoder 345 may differentiate between various commands from the host device 305 based on the states of the C/A pins during each command. For example, the host device 305 may communicate a command to the interface controller 315 by generating a series of voltages on the C/A pins 335 for a set of clock cycles of the clock signal 350. The clock signal 350 may be received from the host device 305 or internally generated by the interface controller 315. A clock cycle may also be referred to as clock pulse or other suitable terminology.

If the system 300 is, for example, implementing a DDR protocol, in some examples the command decoder 345 may decode the commands by capturing the state of the C/A pins 335 at the rising edges and the falling edges of the clock signal 350. For example, the command decoder 345 may capture the state of the C/A pins 335 during the rising edges of the clock signal 350 (which may be referred to as the rising edge states) and determine the type of command based on (e.g., using) the rising edge states. Further, the command decoder 345 may capture the state of the C/A pins 335 during the falling edges of the clock signal 350 (which may be referred to as the falling edge states) and determine additional control information based on (e.g., using) the falling edge states. In some other examples, in contrast to a double data rate protocol, a single data rate protocol may capture the state of the C/A pins 335 during a single edge (e.g., the rising edge or the falling edge, but not both) of a clock cycle.

As a non-limiting example, the C/A pins 335 may include C/A pin 0 (denoted CA0) through C/A pin 6 (denoted CA6) as well as command select pin 0 (denoted CS[0]). However, to maintain compatibility with the protocol supported by the host device 305, the C/A pins 335 may not include one or more pins dedicated to QoS information. According to the techniques described herein, the host device 305 may provide QoS information for a functional command by including (e.g., embedding) the QoS information in a command (which may be referred to as a metadata command) that precedes (or in some alternative examples may follow) the functional command. A metadata command may be a command that includes control information for another command and a functional command may be a command for a memory operation.

The metadata command may be differentiated from other commands using a pin, such as the CS[0] pin, which may be configured for double data rate communications (as opposed to single data rate communications). For example, the host device 305 may use an XCAS command to convey QoS information for a subsequent functional command, and the edge states that indicate the XCAS command may be similar to those that indicate a command access strobe (CAS) command except that an edge state, such as the falling edge state, of the CS[0] pin may be different for the XCAS command relative to the CAS command. For example, the rising edge states that indicate the CAS command (including the rising edge state of the CS[0] pin) may be the same for the XCAS command, but the falling edge state of the CS[0] pin may be high for the CAS command and low for the XCAS command (or vice versa). As another example, the host device 305 may use an XREAD command to convey QoS information for a subsequent functional command, and the edge states that indicate the)(READ command may be similar to those that indicate a read command except that an edge state, such as the falling edge state, of the CS[0] pin may be different for the XREAD command relative to the read command. For example, rising edge states that indicate the read command (including rising edge state of the CS[0] pin) may be the same for the XREAD command, but the falling edge state of the CS[0] pin may be high for the read command and low for the XREAD command (or vice versa).

The XCAS command may convey the QoS information as a set of bits over a subset of the C/A pins 335 (e.g., CA0 through CA3) and in some examples may convey identification information (e.g., a read identifier (RID)) as a set of bits over a different subset of the C/A pins 335 (e.g., CA4 through CA6). For example, the QoS information may be indicated by bits corresponding to the falling edge states of CA0 through CA3, and the RID may be indicated by bits corresponding to the falling edge states of CA4 through CA6. The RID may allow the interface controller 315 to identify the read command associated with the QoS information, which in turn may allow the interface controller 315 to perform out-of-order read operations. Similarly, the XREAD command may convey QoS information as a set of bits over a subset of the C/A pins 335 (e.g., CA0 through CA3) and in some examples may convey other control information over a different subset of the C/A pins 335.

In some examples, the QoS information indicated by a metadata command may be the QoS class for the corresponding functional command. The QoS class may be an example of an Advanced eXtensible Interface (AXI) QoS class, and thus may a represent a very high priority QoS (e.g., HH QoS), a high priority QoS (e.g., H QoS), a moderate priority QoS (e.g., M QoS), or a low priority QoS (e.g., L QoS), among other examples. Other examples of QoS classes are contemplated and within the scope of the disclosure. In some examples, the QoS class may be referred to as the QoS classification, the QoS category, the QoS level or other suitable terminology.

Upon decoding commands from the host device 305, the command decoder 345 may transfer (e.g., communicate) the decoded commands to the transaction command queue (TCQ) component 355. The TCQ component 355 may be configured to temporarily buffer commands from the host device 305 and distribute the commands to other components of the memory subsystem 310, such as the NVM scheduler 360-*a* and the VM scheduler 360-*b*. Thus, the TCQ component 355 may include an array 365 (which may also be referred to as a buffer, a queue, or a storage structure) and logic 370. The array 365 may store commands received from the command decoder 345 as well as control information corresponding to the commands, such as address information (e.g., bank information, row information, column information) and QoS information. The logic 370 may be configured to determine hits and misses for the commands, among other information, so that the TCQ component 355 can communicate the commands and other control information from the array 365 to the appropriate scheduler 360.

If a command for the non-volatile memory 325 is buffered at the array 365, the TCQ component 355 may communicate the command and the QoS information for the command to the NVM scheduler 360-*a*. The NVM scheduler 360-*a* may then use the QoS information to prioritize communication of the command to the non-volatile memory 325 over other commands. For example, the NVM scheduler 360-*a* may prioritize communication of the command based on (e.g., in accordance with) or in response to the QoS information for the command as well as QoS information for other commands queued at the NVM scheduler 360-*a*. Prioritizing communication of the command may include communicating the command to the non-volatile memory 325 before other commands (e.g., commands previously received from the host device 305, commands that have been queued longer at the NVM scheduler 360-*a* or the interface controller 315). Thus, prioritization of the command may allow the command to be executed and serviced sooner than would otherwise occur.

In some examples, the NVM scheduler 360-*a* may use additional information to prioritize the communication of the command, such as the age of the command, which may refer to the amount of time the command has been queued at the NVM scheduler 360-*a* (or queued at the interface controller 315 in general). In some examples, the TCQ component 355 may communicate the command to the NVM scheduler 360-*a* independent or irrespective of the QoS information. That is, the QoS information may be a basis for prioritizing the communication of the command from the NVM scheduler 360-*a* to the non-volatile memory 325 but may not necessarily be a basis for prioritizing communication of the command from the TCQ component to the NVM scheduler 360-*a*.

If a command for the volatile memory 320 is buffered at the array 365, the TCQ component 355 may communicate the command and the QoS information for the command to the VM scheduler 360-*b*. The VM scheduler 360-*b* may then use the QoS information to prioritize communication of the command to the volatile memory 320 over other commands. For example, the VM scheduler 360-*b* prioritize communication of the command based on (e.g., in accordance with) or in response to the QoS information for the command as well as QoS information for other commands queued at the VM scheduler 360-*b*. Prioritizing communication of the command may include communicating the command to the volatile memory 320 before other commands (e.g., commands previously received from the host device 305, commands that have been queued longer at the VM scheduler 360-*b* or the interface controller 315). Thus, prioritization of the command may allow the command to be executed and serviced sooner than would otherwise occur.

In some examples, the VM scheduler 360-*b* may use additional information to prioritize the communication of the command, such as the age of the command, which may refer to the amount of time the command has been queued at the VM scheduler 360-*b* (or queued at the interface controller 315 in general). In some examples, the TCQ component 355 may communicate the command to the VM scheduler 360-*b* independent or irrespective of the QoS information. That is, the QoS information may be a basis for prioritizing the communication of the command from the VM scheduler 360-*b* to the volatile memory 320 but may not necessarily be a basis for prioritizing communication of the command from the TCQ component to the VM scheduler 360-*b*.

Data associated with read commands may be received from the non-volatile memory 325 or the volatile memory 320 or both and may be stored at one or more read buffers coupled with the TCQ component 355. If a read command is associated with QoS information received from the host device 305, the TCQ component 355 may prioritize the communication of that read command's data based on (e.g., in accordance with) or in response to the QoS information for that read command (and possibly based on QoS information for other read commands with buffered data). Thus, the interface controller 315 may prioritize the return (e.g., communication) of requested data to the host device 305 based on or in response to the QoS information associated with the read command for that data.

Figure 4:
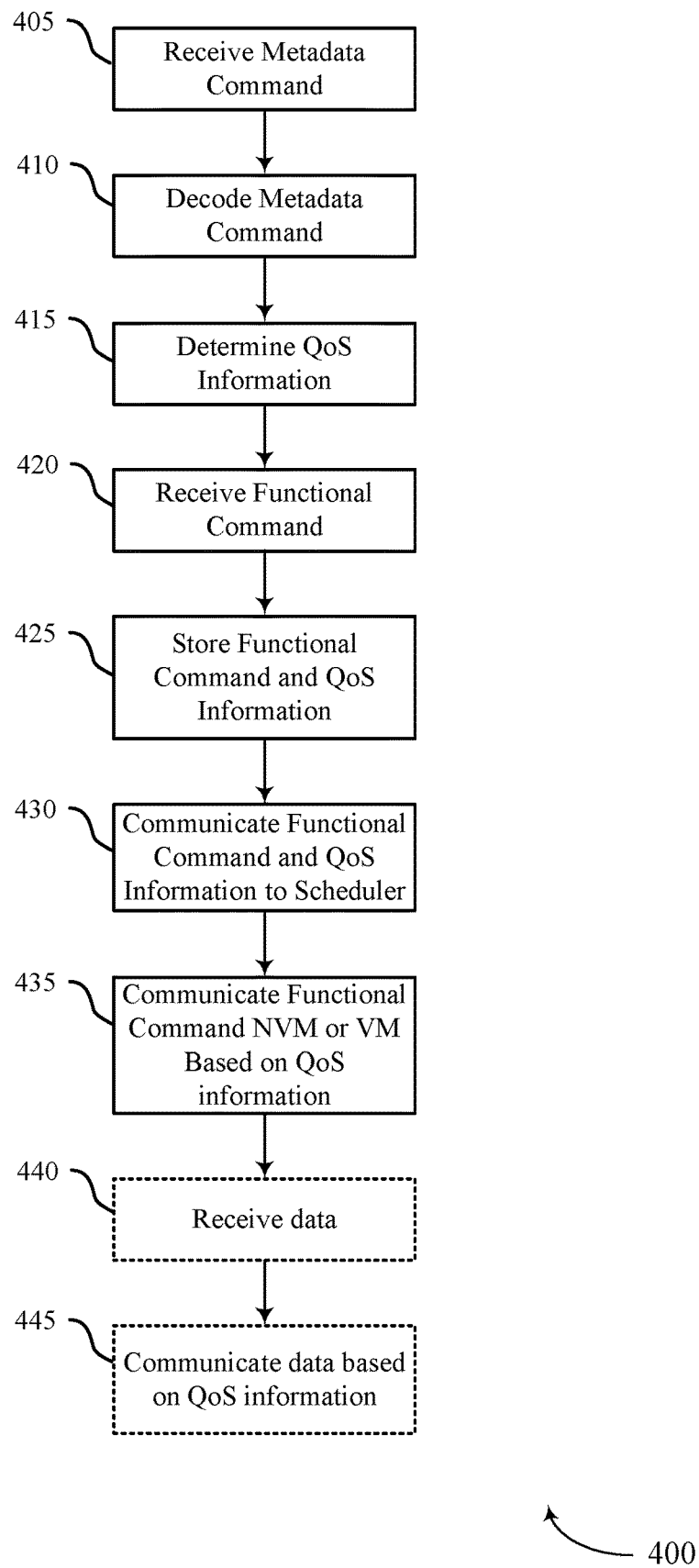
FIG. 4 illustrates an example of a process flow that supports quality-of-service information for a multi-memory system in accordance with examples as disclosed herein.

FIG. 4 illustrates an example of a process flow 400 that supports quality-of-service information for a multi-memory system in accordance with examples as disclosed herein. Process flow 400 may be implemented by a memory subsystem 110 or an interface controller 115 as described with reference to FIG. 1, a memory subsystem 200 or an interface controller 202 as described with reference to FIG. 2, or a memory subsystem 310 or an interface controller 315 as described with reference to FIG. 3. However, other types of devices or components (or combinations thereof) may implement process flow 400. The process flow 400 may illustrate the operations of a device that receives QoS information for a functional command.

For ease of reference, the process flow 400 is described with reference to a device. For example, aspects of the process flow 400 may be implemented by a device that includes a volatile memory and a non-volatile memory. Additionally or alternatively, aspects of the process flow 400 may be implemented as instructions stored in memory (e.g., firmware stored in the volatile memory 120 or the non-volatile memory 125 or both). For example, the instructions, if executed by a controller, may cause the controller to perform the operations of the process flow 400.

At 405, a command, such as a metadata command, may be received from a host device. For example, the interface controller 315 may receive a command, such as an XCAS or XREAD command, over the C/A bus interface 340, which may be a DRAM interface. In some examples, one or more activate (ACT) commands may be received before 405. The activate commands may activate one or more rows in one or more banks of a memory of the memory subsystem 310.

At 410, the metadata command may be decoded. For example, the command decoder 345 may decode the metadata command based on (e.g., using) the rising edge state and falling edge state of the CS[0] pin, among other states of other pins. The rising edge state and falling edge state of the CS[0] may differentiate the metadata command from a similar command, such as a CAS command or a read command.

At 415, QoS information for a functional command (e.g., the functional command next following the metadata command for example immediately following the metadata command) may be determined based on (e.g., in response to) decoding the metadata command. For example, the command decoder 345 may determine QoS information included in the metadata command. In some examples, the command decoder 345 may also determine an identifier for the functional command based on (e.g., in response to) decoding the metadata command. For example, the command decoder 345 may determine a read identifier included in the metadata command.

At 420, a functional command may be received. For example, a read command or a write command may be received from the host device 305 over the C/A bus 330. Other examples of functional commands include pre-charge commands and activate commands. At 425, the functional command and the QoS information for the functional command may be stored. For example, the interface controller 315 may store the functional command and the QoS information in the array 365, potentially with other control information for the functional command.

At 430, the functional command and QoS information may be communicated to a scheduler, potentially with other control information for the functional command. For example, if the functional command is for the volatile memory 320, the TCQ component 355 may communicate the functional command to the VM scheduler 360-b. If the functional command is for the non-volatile memory 325, the TCQ component 355 may communicate the functional command to the NVM scheduler 360-a. The TCQ component 355 may determine the appropriate scheduler for the functional command based on the hit or miss status of the functional command, among other factors. In some examples, the TCQ component 355 may prioritize communication of the functional command to the scheduler based on (e.g., in accordance with) the QoS information. In some examples, the TCQ component 355 may communicate the functional command and QoS information to the scheduler irrespective of the QoS information.

At 435, the functional command may be communicated to the appropriate memory. The communication of the functional command may be prioritized based on (e.g., in accordance with) the QoS information for the functional command as well as, in some examples, QoS information for other functional commands queued at the scheduler. If the functional command is for the volatile memory 320, the VM scheduler 360-b may communicate the functional command to the volatile memory 320. If the functional command is for the non-volatile memory 325, the NVM scheduler 360-a may communicate the functional command to the non-volatile memory 325. If the functional command is associated with a high QoS class, prioritizing communication of the functional command may refer to communicating the functional command to the appropriate memory before other commands for that memory (e.g., commands that were received from the host device before the functional command, commands that have been pending longer than the functional command). If the functional command is associated with a low QoS class, prioritizing communication of the functional command may refer to communicating the functional command to the appropriate memory after other commands for that memory (e.g., commands that were received from the host device after the functional command, commands that have been pending shorter than the functional command). In some examples, the scheduler may communicate the functional command to the memory based on the age of the functional command.

At 440, data may be received. For example, the interface controller 315 may receive data from the volatile memory 320 or the non-volatile memory 325. The data may correspond to the functional command, which may be a read command. At 445, the data may be communicated. For example, the interface controller may communicate the data to the host device 305. The communication of the data may be prioritized based on the QoS information for the read command associated with the data as well as, in some examples, QoS information for other read commands with data buffered at the interface controller 315.

Alternative examples of the foregoing may be implemented, where some operations are performed in a different order than described, are performed in parallel, or are not performed at all. In some cases, operations may include additional features not mentioned herein, or further operations may be added. Additionally, certain operations may be performed multiple times or certain combinations of operations may repeat or cycle.

Figure 5:
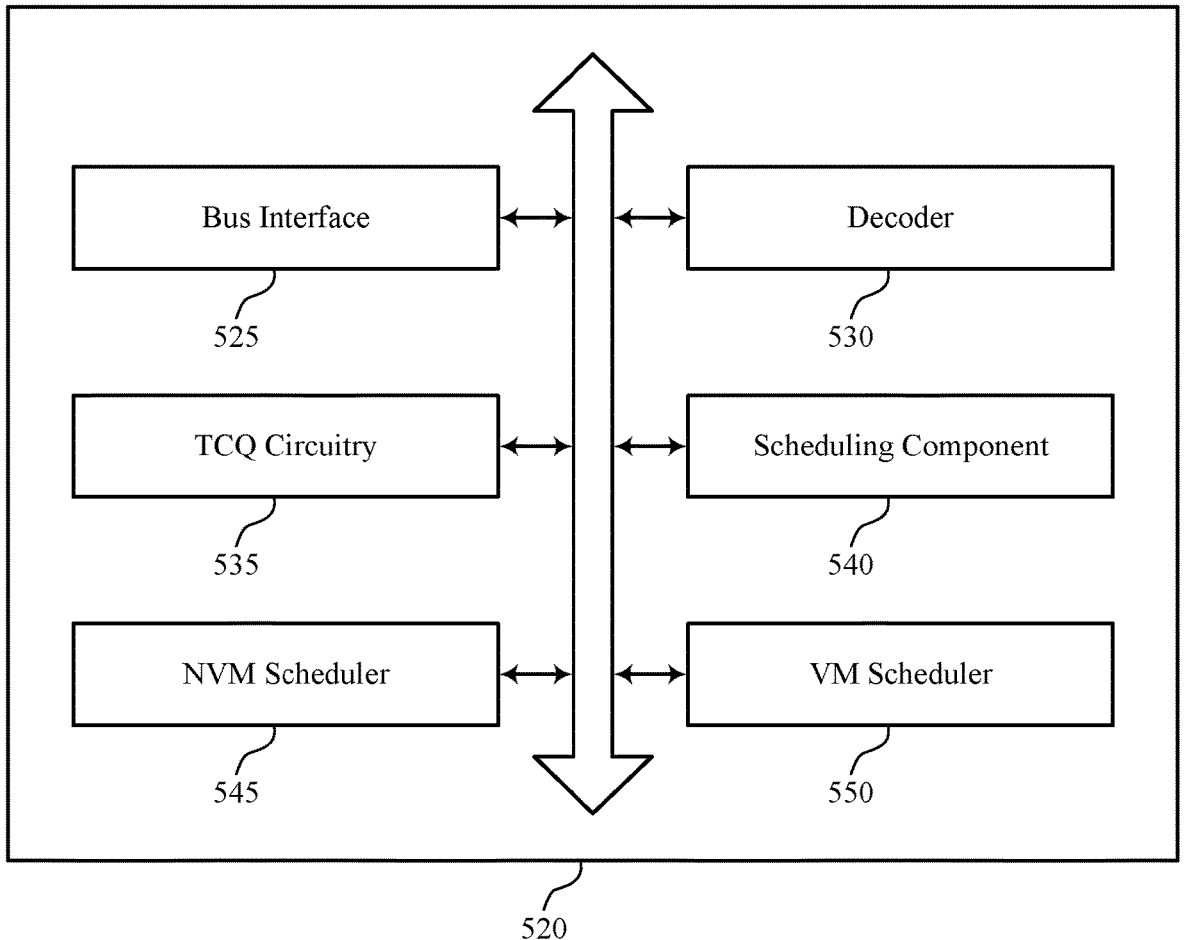
FIG. 5 shows a block diagram of a memory device that supports quality-of-service information for a multi-memory system in accordance with examples as disclosed herein.

FIG. 5 shows a block diagram 500 of a memory device 520 that supports quality-of-service information for a multi-memory system in accordance with examples as disclosed herein. The memory device 520 may be an example of aspects of a memory device as described with reference to FIGS. 1 through 4. The memory device 520, or various components thereof, may be an example of means for performing various aspects of quality-of-service information for a multi-memory system as described herein. For example, the memory device 520 may include a bus interface 525, a decoder 530, a TCQ circuitry 535, a scheduling component 540, an NVM scheduler 545, a VM scheduler 550, or any combination thereof. Each of these components may communicate, directly or indirectly, with one another (e.g., via one or more buses).

The bus interface 525 may be or include a command/address bus, a command/address bus interface, a buffer, logic, circuitry, a processor, a controller, a receiver, or other components capable of performing the functions described herein. The decoder 530 may be logic or circuitry capable of performing the functions described herein. The TCQ circuitry 535 may be or include logic, circuitry, a processor, a controller, or other components capable of performing the functions described herein. The scheduling component 540 may be or include logic, circuitry, a processor, a controller, or other components capable of performing the functions described herein. The NVM scheduler 545 may be or include logic, circuitry, a processor, a controller, or other components capable of performing the functions described herein. The VM scheduler 550 may be or include logic, circuitry, a processor, a controller, or other components capable of performing the functions described herein. In some examples, the NVM scheduler 545 and the VM scheduler 550 may be included in the scheduling component 540.

The bus interface 525 may be configured as or otherwise support a means for receiving a first command from a host device during a set of clock cycles and over a command bus including a command select pin configured for double data rate signaling. The decoder 530 may be configured as or otherwise support a means for decoding the first command based at least in part on a state of the command select pin during at least one clock cycle of the set of clock cycles. In some examples, the decoder 530 may be configured as or otherwise support a means for determining QoS information for a second command based at least in part on decoding the first command and on a plurality of bits included in the first command, the second command including a read command or a write command.

In some examples, the plurality of bits indicate a QoS class for the second command. In some examples, the first command is decoded based at least in part on the state of the command select pin during at least one rising edge and one falling edge of the at least one clock cycle. In some examples, the scheduling component 540 may be configured as or otherwise support a means for prioritizing communication of the second command to the non-volatile memory or the volatile memory based at least in part on the QoS information for the second command.

In some examples, the scheduling component 540 may be configured as or otherwise support a means for prioritizing communication of the second command to the non-volatile memory or the volatile memory based at least in part on an amount of time the second command is queued at the interface controller. In some examples, the second command includes a read command, and the TCQ circuitry 535 may be configured as or otherwise support a means for prioritizing communication of data associated with the second command to the host device based at least in part on the QoS information for the second command.

In some examples, the NVM scheduler 545 may be configured as or otherwise support a means for storing in an array the second command and the QoS information for the second command. In some examples, the NVM scheduler 545 may be configured as or otherwise support a means for prioritizing communication of the second command to the non-volatile memory based at least in part on the QoS information for the second command.

In some examples, the VM scheduler 550 may be configured as or otherwise support a means for storing in an array the second command and the QoS information for the second command. In some examples, the VM scheduler 550 may be configured as or otherwise support a means for prioritizing communication of the second command to the volatile memory based at least in part on the QoS information for the second command.

In some examples, the decoder 530 may be configured as or otherwise support a means for determining an identifier for the second command based at least in part on a second plurality of bits included in the first command, the second plurality of bits indicating the identifier.

In some examples, the bus interface 525 may be configured as or otherwise support a means for receiving a first command from a host device during a set of clock cycles and over a command bus including a command select pin configured for double data rate signaling. In some examples, the decoder 530 may be configured as or otherwise support a means for decoding the first command based at least in part on a state of the command select pin during at least one clock cycle of the set of clock cycles.

In some examples, the decoder 530 may be configured as or otherwise support a means for determining, based at least in part on decoding the first command and on a plurality of bits included in the first command, QoS information for a read command received over the command bus after the first command. The TCQ circuitry 535 may be configured as or otherwise support a means for prioritizing communication of data associated with the read command to the host device based at least in part on the QoS information for the read command.

In some examples, the first command is decoded based at least in part on the state of the command select pin during at least one rising edge and one falling edge of the at least one clock cycle. In some examples, the scheduling component 540 may be configured as or otherwise support a means for prioritizing communication of the read command to the non-volatile memory or the volatile memory based at least in part on the QoS information for the read command.

In some examples, the scheduling component 540 may be configured as or otherwise support a means for prioritizing communication of the read command to the non-volatile memory or the volatile memory based at least in part on an amount of time the read command is queued at the interface controller. In some examples, the decoder 530 may be configured as or otherwise support a means for determining an identifier for the read command based at least in part on a second plurality of bits included in the first command.

In some examples, the NVM scheduler 545 may be configured as or otherwise support a means for storing in an array the read command and the QoS information for the read command. In some examples, the NVM scheduler 545 may be configured as or otherwise support a means for prioritizing communication of the read command to the non-volatile memory based at least in part on the QoS information for the read command.

In some examples, the VM scheduler 550 may be configured as or otherwise support a means for storing in an array the read command and the QoS information for the read command. In some examples, the VM scheduler 550 may be configured as or otherwise support a means for prioritizing communication of the read command to the volatile memory based at least in part on the QoS information for the read command, the logic configured to receive the read command and the QoS information for the read command from the array.

In some examples, the bus interface 525 may be configured as or otherwise support a means for receiving a first command from a host device during a set of clock cycles and over a command bus including a command select pin configured for double data rate signaling. In some examples, the decoder 530 may be configured as or otherwise support a means for decoding the first command based at least in part on a state of the command select pin during at least one clock cycle of the set of clock cycles. In some examples, the decoder 530 may be configured as or otherwise support a means for determine, based at least in part on decoding the first command and on a plurality of bits included in the first command, QoS information for a write command received over the command bus after the first command. The scheduling component 540 may be configured as or otherwise support a means for prioritizing communication of the write command to the non-volatile memory or the volatile memory based at least in part on the QoS information for the write command.

In some examples, the first command is decoded based at least in part on the state of the command select pin during at least one rising edge and one falling edge of the at least one clock cycle.

In some examples, the scheduling component 540 may be configured as or otherwise support a means for prioritizing communication of the write command to the non-volatile memory or the volatile memory based at least in part on an amount of time the write command is queued at the interface controller.

Figure 6:
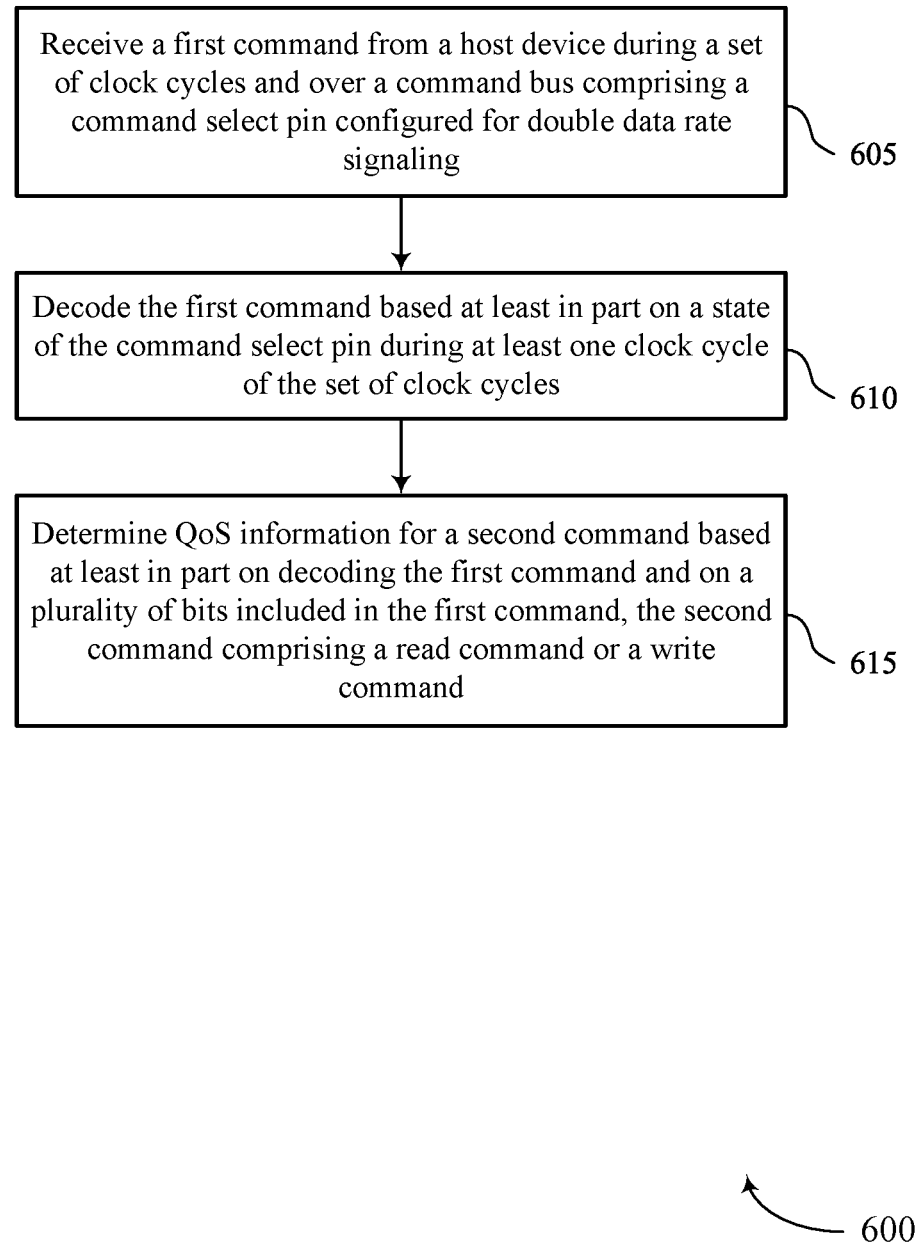
FIGS. 6 through 8 show flowcharts illustrating a method or methods that support quality-of-service information for a multi-memory system in accordance with examples as disclosed herein.

FIG. 6 shows a flowchart illustrating a method 600 that supports quality-of-service information for a multi-memory system in accordance with examples as disclosed herein. The operations of method 600 may be implemented by a memory device or its components as described herein. For example, the operations of method 600 may be performed by a memory device as described with reference to FIGS. 1 through 5. In some examples, a memory device may execute a set of instructions to control the functional elements of the device to perform the described functions. Additionally or alternatively, the memory device may perform aspects of the described functions using special-purpose hardware.

At 605, the method may include receiving a first command from a host device during a set of clock cycles and over a command bus including a command select pin configured for double data rate signaling. The operations of 605 may be performed in accordance with examples as disclosed herein. In some examples, aspects of the operations of 605 may be performed by a bus interface 525 as described with reference to FIG. 5.

At 610, the method may include decoding the first command based at least in part on a state of the command select pin during at least one clock cycle of the set of clock cycles. The operations of 610 may be performed in accordance with examples as disclosed herein. In some examples, aspects of the operations of 610 may be performed by a decoder 530 as described with reference to FIG. 5.

At 615, the method may include determining QoS information for a second command based at least in part on decoding the first command and on a plurality of bits included in the first command, the second command including a read command or a write command. The operations of 615 may be performed in accordance with examples as disclosed herein. In some examples, aspects of the operations of 615 may be performed by a decoder 530 as described with reference to FIG. 5.

In some examples, an apparatus as described herein may perform a method or methods, such as the method 600. The apparatus may include, features, circuitry, logic, means, or instructions (e.g., a non-transitory computer-readable medium storing instructions executable by a processor) for receiving a first command from a host device during a set of clock cycles and over a command bus including a command select pin configured for double data rate signaling, decoding the first command based at least in part on a state of the command select pin during at least one clock cycle of the set of clock cycles, and determining QoS information for a second command based at least in part on decoding the first command and on a plurality of bits included in the first command, the second command including a read command or a write command.

In some examples of the method 600 and the apparatus described herein, the plurality of bits indicate a QoS class for the second command. In some examples of the method 600 and the apparatus described herein, the first command may be decoded based at least in part on the state of the command select pin during at least one rising edge and one falling edge of the at least one clock cycle.

Some examples of the method 600 and the apparatus described herein may further include operations, features, circuitry, logic, means, or instructions for prioritizing communication of the second command to the non-volatile memory or the volatile memory based at least in part on the QoS information for the second command.

Some examples of the method 600 and the apparatus described herein may further include operations, features, circuitry, logic, means, or instructions for prioritizing communication of the second command to the non-volatile memory or the volatile memory based at least in part on an amount of time the second command may be queued at the interface controller.

In some examples of the method 600 and the apparatus described herein, the second command includes a read command and the method, apparatuses, and non-transitory computer-readable medium may include further operations, features, circuitry, logic, means, or instructions for prioritizing communication of data associated with the second command to the host device based at least in part on the QoS information for the second command.

Some examples of the method 600 and the apparatus described herein may further include operations, features, circuitry, logic, means, or instructions for storing in an array the second command and the QoS information for the second command and prioritizing communication of the second command to the non-volatile memory based at least in part on the QoS information for the second command.

Some examples of the method 600 and the apparatus described herein may further include operations, features, circuitry, logic, means, or instructions for storing in an array the second command and the QoS information for the second command and prioritizing communication of the second command to the volatile memory based at least in part on the QoS information for the second command.

Some examples of the method 600 and the apparatus described herein may further include operations, features, circuitry, logic, means, or instructions for determining an identifier for the second command based at least in part on a second plurality of bits included in the first command, the second plurality of bits indicating the identifier.

Figure 7:
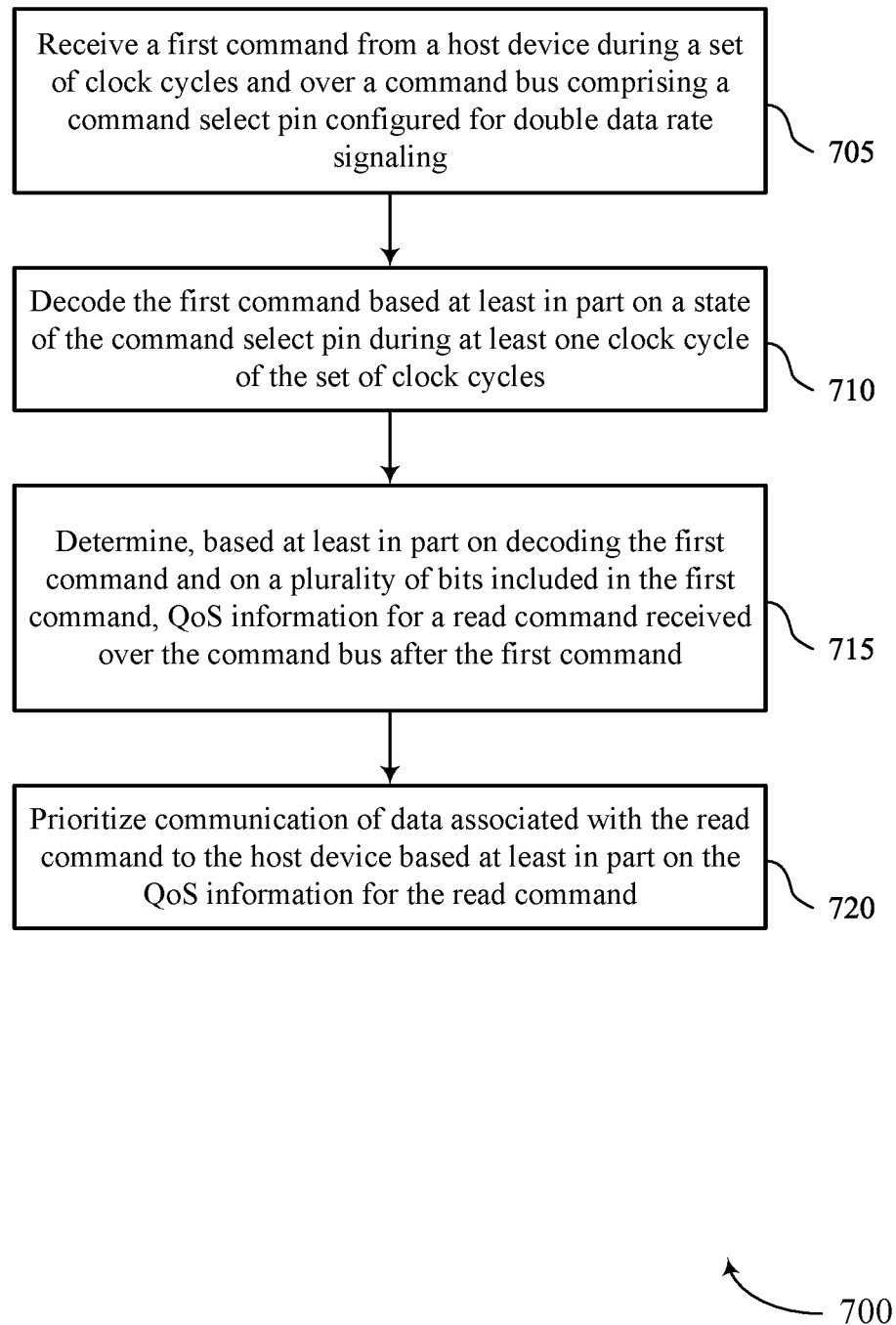

FIG. 7 shows a flowchart illustrating a method 700 that supports quality-of-service information for a multi-memory system in accordance with examples as disclosed herein. The operations of method 700 may be implemented by a memory device or its components as described herein. For example, the operations of method 700 may be performed by a memory device as described with reference to FIGS. 1 through 5. In some examples, a memory device may execute a set of instructions to control the functional elements of the device to perform the described functions. Additionally or alternatively, the memory device may perform aspects of the described functions using special-purpose hardware.

At 705, the method may include receiving a first command from a host device during a set of clock cycles and over a command bus including a command select pin configured for double data rate signaling. The operations of 705 may be performed in accordance with examples as disclosed herein. In some examples, aspects of the operations of 705 may be performed by a bus interface 525 as described with reference to FIG. 5.

At 710, the method may include decoding the first command based at least in part on a state of the command select pin during at least one clock cycle of the set of clock cycles. The operations of 710 may be performed in accordance with examples as disclosed herein. In some examples, aspects of the operations of 710 may be performed by a decoder 530 as described with reference to FIG. 5.

At 715, the method may include determining, based at least in part on (e.g., in response to) decoding the first command and on a plurality of bits included in the first command, QoS information for a read command received over the command bus after the first command. The operations of 715 may be performed in accordance with examples as disclosed herein. In some examples, aspects of the operations of 715 may be performed by a decoder 530 as described with reference to FIG. 5.

At 720, the method may include prioritizing communication of data associated with the read command to the host device based at least in part on (e.g., in accordance with) the QoS information for the read command. The operations of 720 may be performed in accordance with examples as disclosed herein. In some examples, aspects of the operations of 720 may be performed by a TCQ circuitry 535 as described with reference to FIG. 5.

In some examples, an apparatus as described herein may perform a method or methods, such as the method 700. The apparatus may include, features, circuitry, logic, means, or instructions (e.g., a non-transitory computer-readable medium storing instructions executable by a processor) for receiving a first command from a host device during a set of clock cycles and over a command bus including a command select pin configured for double data rate signaling, decoding the first command based at least in part on a state of the command select pin during at least one clock cycle of the set of clock cycles, determining, based at least in part on decoding the first command and on a plurality of bits included in the first command, QoS information for a read command received over the command bus after the first command, and prioritizing communication of data associated with the read command to the host device based at least in part on the QoS information for the read command.

In some examples of the method 700 and the apparatus described herein, the first command may be decoded based at least in part on the state of the command select pin during at least one rising edge and one falling edge of the at least one clock cycle.

Some examples of the method 700 and the apparatus described herein may further include operations, features, circuitry, logic, means, or instructions for prioritizing communication of the read command to the non-volatile memory or the volatile memory based at least in part on the QoS information for the read command.

Some examples of the method 700 and the apparatus described herein may further include operations, features, circuitry, logic, means, or instructions for prioritizing communication of the read command to the non-volatile memory or the volatile memory based at least in part on an amount of time the read command may be queued at the interface controller.

Some examples of the method 700 and the apparatus described herein may further include operations, features, circuitry, logic, means, or instructions for determining an identifier for the read command based at least in part on a second plurality of bits included in the first command.

Some examples of the method 700 and the apparatus described herein may further include operations, features, circuitry, logic, means, or instructions for storing in an array the read command and the QoS information for the read command and prioritizing communication of the read command to the non-volatile memory based at least in part on the QoS information for the read command.

Some examples of the method 700 and the apparatus described herein may further include operations, features, circuitry, logic, means, or instructions for storing in an array the read command and the QoS information for the read command and prioritizing communication of the read command to the volatile memory based at least in part on the QoS information for the read command, the logic configured to receive the read command and the QoS information for the read command from the array.

Figure 8:
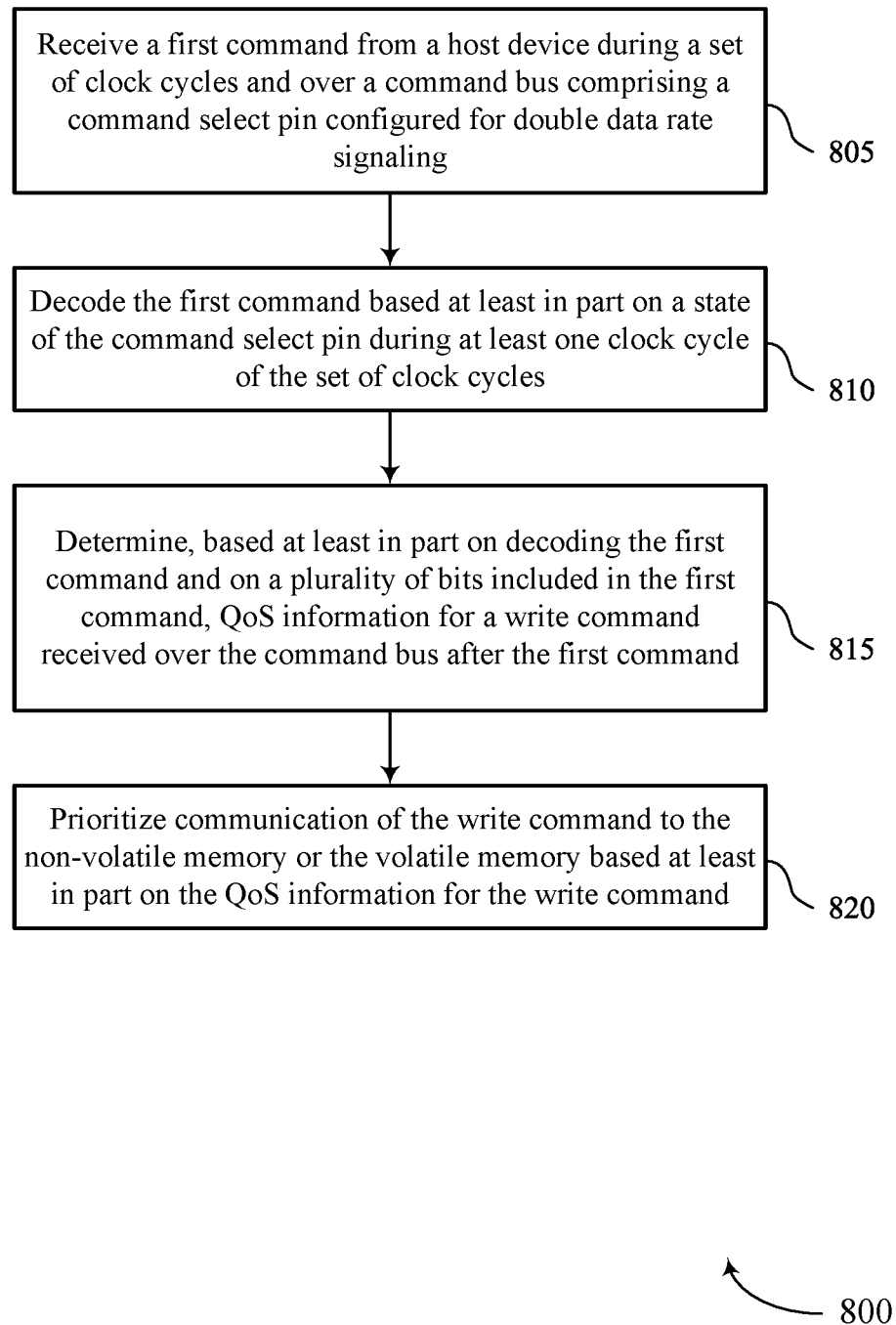

FIG. 8 shows a flowchart illustrating a method 800 that supports quality-of-service information for a multi-memory system in accordance with examples as disclosed herein. The operations of method 800 may be implemented by a memory device or its components as described herein. For example, the operations of method 800 may be performed by a memory device as described with reference to FIGS. 1 through 5. In some examples, a memory device may execute a set of instructions to control the functional elements of the device to perform the described functions. Additionally or alternatively, the memory device may perform aspects of the described functions using special-purpose hardware.

At 805, the method may include receiving a first command from a host device during a set of clock cycles and over a command bus including a command select pin configured for double data rate signaling. The operations of 805 may be performed in accordance with examples as disclosed herein. In some examples, aspects of the operations of 805 may be performed by a bus interface 525 as described with reference to FIG. 5.

At 810, the method may include decoding the first command based at least in part on a state of the command select pin during at least one clock cycle of the set of clock cycles. The operations of 810 may be performed in accordance with examples as disclosed herein. In some examples, aspects of the operations of 810 may be performed by a decoder 530 as described with reference to FIG. 5.

At 815, the method may include determine, based at least in part on (e.g., in response to) decoding the first command and on a plurality of bits included in the first command, QoS information for a write command received over the command bus after the first command. The operations of 815 may be performed in accordance with examples as disclosed herein. In some examples, aspects of the operations of 815 may be performed by a decoder 530 as described with reference to FIG. 5.

At 820, the method may include prioritizing communication of the write command to the non-volatile memory or the volatile memory based at least in part on (e.g., in accordance with) the QoS information for the write command. The operations of 820 may be performed in accordance with examples as disclosed herein. In some examples, aspects of the operations of 820 may be performed by a scheduling component 540 as described with reference to FIG. 5.

In some examples, an apparatus as described herein may perform a method or methods, such as the method 800. The apparatus may include, features, circuitry, logic, means, or instructions (e.g., a non-transitory computer-readable medium storing instructions executable by a processor) for receiving a first command from a host device during a set of clock cycles and over a command bus including a command select pin configured for double data rate signaling, decoding the first command based at least in part on a state of the command select pin during at least one clock cycle of the set of clock cycles, determine, based at least in part on decoding the first command and on a plurality of bits included in the first command, QoS information for a write command received over the command bus after the first command, and prioritizing communication of the write command to the non-volatile memory or the volatile memory based at least in part on the QoS information for the write command.

In some examples of the method 800 and the apparatus described herein, the first command may be decoded based at least in part on the state of the command select pin during at least one rising edge and one falling edge of the at least one clock cycle.

Some examples of the method 800 and the apparatus described herein may further include operations, features, circuitry, logic, means, or instructions for prioritizing communication of the write command to the non-volatile memory or the volatile memory based at least in part on an amount of time the write command may be queued at the interface controller.

It should be noted that the methods described herein describe possible implementations, and that the operations and the steps may be rearranged or otherwise modified and that other implementations are possible. Further, portions from two or more of the methods may be combined.

An apparatus is described. The apparatus may include a non-volatile memory, a volatile memory configured to operate as a cache for the non-volatile memory, an interface controller coupled with the non-volatile memory and the volatile memory, the interface controller operable to cause the apparatus to, receive a first command from a host device during a set of clock cycles and over a command bus including a command select pin configured for double data rate signaling, decode the first command based at least in part on a state of the command select pin during at least one clock cycle of the set of clock cycles, and determine QoS information for a second command based at least in part on decoding the first command and on a plurality of bits included in the first command, the second command including a read command or a write command.

In some examples of the apparatus, the plurality of bits indicate a QoS class for the second command. In some examples of the apparatus, the first command may be decoded based at least in part on the state of the command select pin during at least one rising edge and one falling edge of the at least one clock cycle. In some examples, the apparatus may include prioritize communication of the second command to the non-volatile memory or the volatile memory based at least in part on the QoS information for the second command.

In some examples, the apparatus may include prioritize communication of the second command to the non-volatile memory or the volatile memory based at least in part on an amount of time the second command may be queued at the interface controller. In some examples, the apparatus may include prioritize communication of data associated with the second command to the host device based at least in part on the QoS information for the second command.

In some examples, the apparatus may include an array configured to store the second command and the QoS information for the second command and logic coupled with the array and the non-volatile memory and configured to prioritize communication of the second command to the non-volatile memory based at least in part on the QoS information for the second command, the logic configured to receive the second command and the QoS information for the second command from the array.

In some examples, the apparatus may include an array configured to store the second command and the QoS information for the second command and logic coupled with the array and the volatile memory and configured to prioritize communication of the second command to the volatile memory based at least in part on the QoS information for the second command, the logic configured to receive the second command and the QoS information for the second command from the array.

In some examples, the apparatus may include determine an identifier for the second command based at least in part on a second plurality of bits included in the first command, the second plurality of bits indicating the identifier.

In some examples of the apparatus, the volatile memory includes DRAM cells and the interface controller may be operable to interface with the host device over a DRAM interface.

Another apparatus is described. The apparatus may include a non-volatile memory, a volatile memory configured to operate as a cache for the non-volatile memory, an interface controller coupled with the non-volatile memory and the volatile memory, the interface controller operable to cause the apparatus to, receive a first command from a host device during a set of clock cycles and over a command bus including a command select pin configured for double data rate signaling, decode the first command based at least in part on a state of the command select pin during at least one clock cycle of the set of clock cycles, determine, based at least in part on decoding the first command and on a plurality of bits included in the first command, QoS information for a read command received over the command bus after the first command, and prioritize communication of data associated with the read command to the host device based at least in part on the QoS information for the read command.

In some examples of the apparatus, the first command may be decoded based at least in part on the state of the command select pin during at least one rising edge and one falling edge of the at least one clock cycle. In some examples, the apparatus may include prioritize communication of the read command to the non-volatile memory or the volatile memory based at least in part on the QoS information for the read command.

In some examples, the apparatus may include prioritize communication of the read command to the non-volatile memory or the volatile memory based at least in part on an amount of time the read command may be queued at the interface controller. In some examples, the apparatus may include determining an identifier for the read command based at least in part on a second plurality of bits included in the first command.

In some examples, the apparatus may include an array configured to store the read command and the QoS information for the read command and logic coupled with the array and the non-volatile memory and configured to prioritize communication of the read command to the non-volatile memory based at least in part on the QoS information for the read command, the logic configured to receive the read command and the QoS information for the read command from the array.

In some examples, the apparatus may include an array configured to store the read command and the QoS information for the read command and logic coupled with the array and the volatile memory and configured to prioritize communication of the read command to the volatile memory based at least in part on the QoS information for the read command, the logic configured to receive the read command and the QoS information for the read command from the array.

Another apparatus is described. The apparatus may include a non-volatile memory, a volatile memory configured to operate as a cache for the non-volatile memory, an interface controller coupled with the non-volatile memory and the volatile memory, the interface controller operable to cause the apparatus to, receive a first command from a host device during a set of clock cycles and over a command bus including a command select pin configured for double data rate signaling, decode the first command based at least in part on a state of the command select pin during at least one clock cycle of the set of clock cycles, determine, based at least in part on decoding the first command and on a plurality of bits included in the first command, QoS information for a write command received over the command bus after the first command, and prioritize communication of the write command to the non-volatile memory or the volatile memory based at least in part on the QoS information for the write command.

In some examples of the apparatus, the first command may be decoded based at least in part on the state of the command select pin during at least one rising edge and one falling edge of the at least one clock cycle. In some examples, the apparatus may include prioritize communication of the write command to the non-volatile memory or the volatile memory based at least in part on an amount of time the write command may be queued at the interface controller.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

A protocol may define one or more communication procedures and one or more communication parameters supported for use by a device or component. For example, a protocol may define various operations, a timing and a frequency for those operations, a meaning of various commands or signals or both, one or more addressing scheme(s) for one or more memories, a type of communication for which pins are reserved, a size of data handled at various components such as interfaces, a data rate supported by various components such as interfaces, or a bandwidth supported by various components such as interfaces, among other parameters and metrics, or any combination thereof. Use of a shared protocol may enable interaction between devices because each device may operate in a manner expected, recognized, and understood by another device. For example, two devices that support the same protocol may interact according to the policies, procedures, and parameters defined by the protocol, whereas two devices that support different protocols may be incompatible.

To illustrate, two devices that support different protocols may be incompatible because the protocols define different addressing schemes (e.g., different quantities of address bits). As another illustration, two devices that support different protocols may be incompatible because the protocols define different transfer procedures for responding to a single command (e.g., the burst length or quantity of bytes permitted in response to the command may differ). Merely translating a command to an action should not be construed as use of two different protocols. Rather, two protocols may be considered different if corresponding procedures or parameters defined by the protocols vary. For example, a device may be said to support two different protocols if the device supports different addressing schemes, or different transfer procedures for responding to a command.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on or in response to the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

As used herein, the term "substantially" means that the modified characteristic (e.g., a verb or adjective modified by the term substantially) need not be absolute but is close enough to achieve the advantages of the characteristic. As used herein, the term "concurrently" means that the described actions or phenomena occur during durations that at least partially overlap in time, that can occur at substantially the same time or be offset in time.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a non-volatile memory;
a volatile memory configured to operate as a cache for the non-volatile memory; and
an interface controller coupled with the non-volatile memory and the volatile memory, the interface controller operable to cause the apparatus to:
receive a set of bits from a host device during a set of clock cycles and over a command bus comprising a command select pin configured for double data rate signaling;
determine whether the set of bits represents a first command or metadata for a second command based at least in part on a state of the command select pin during at least one clock cycle of the set of clock cycles; and
determine, based at least in part on the state of the command select pin indicating that the set of bits represents metadata for the second command, quality-of-service (QoS) information for the second command based at least in part on a plurality of bits included in the set of bits, the second command comprising a read command or a write command.

2. The apparatus of claim 1, wherein the plurality of bits indicate a QoS class for the second command.

3. The apparatus of claim 1, wherein the set of bits is decoded based at least in part on the state of the command select pin during at least one rising edge and one falling edge of the at least one clock cycle.

4. The apparatus of claim 1, wherein the interface controller is further operable to cause the apparatus to:
prioritize communication of the second command to the non-volatile memory or the volatile memory based at least in part on the QoS information for the second command.

5. The apparatus of claim 4, wherein the interface controller is further operable to cause the apparatus to:
prioritize communication of the second command to the non-volatile memory or the volatile memory based at least in part on an amount of time the second command is queued at the interface controller.

6. The apparatus of claim 1, wherein the second command comprises a read command, and wherein the interface controller is further operable to cause the apparatus to:
prioritize communication of data associated with the second command to the host device based at least in part on the QoS information for the second command.

7. The apparatus of claim 1, further comprising:
an array configured to store the second command and the QoS information for the second command; and
logic coupled with the array and the non-volatile memory and configured to prioritize communication of the second command to the non-volatile memory based at least in part on the QoS information for the second command, the logic configured to receive the second command and the QoS information for the second command from the array.

8. The apparatus of claim 1, further comprising:
an array configured to store the second command and the QoS information for the second command; and
logic coupled with the array and the volatile memory and configured to prioritize communication of the second command to the volatile memory based at least in part on the QoS information for the second command, the logic configured to receive the second command and the QoS information for the second command from the array.

9. The apparatus of claim 1, wherein the interface controller is further operable to cause the apparatus to:
determine an identifier for the second command based at least in part on a second plurality of bits included in the set of bits, the second plurality of bits indicating the identifier.

10. The apparatus of claim 1, wherein the volatile memory comprises dynamic random access memory (DRAM) cells and the interface controller is operable to interface with the host device over a DRAM interface.

11. An apparatus, comprising:
a non-volatile memory;
a volatile memory configured to operate as a cache for the non-volatile memory; and
an interface controller coupled with the non-volatile memory and the volatile memory, the interface controller operable to cause the apparatus to:
receive a set of bits from a host device during a set of clock cycles and over a command bus comprising a command select pin configured for double data rate signaling;
determine whether the set of bits represents a first command or metadata for a second command based at least in part on a state of the command select pin during at least one clock cycle of the set of clock cycles;
determine, based at least in part on the state of the command select pin indicating that the set of bits represents metadata for the second command and on a plurality of bits included in the set of bits, quality-of-service (QoS) information for a read command received over the command bus after the set of bits; and
prioritize communication of data associated with the read command to the host device based at least in part on the QoS information for the read command.

12. The apparatus of claim 11, wherein the set of bits is decoded based at least in part on the state of the command select pin during at least one rising edge and one falling edge of the at least one clock cycle.

13. The apparatus of claim 11, wherein the interface controller is further operable to cause the apparatus to:
prioritize communication of the read command to the non-volatile memory or the volatile memory based at least in part on the QoS information for the read command.

14. The apparatus of claim 11, wherein the interface controller is further operable to cause the apparatus to:
prioritize communication of the read command to the non-volatile memory or the volatile memory based at least in part on an amount of time the read command is queued at the interface controller.

15. The apparatus of claim 11, wherein the interface controller is further operable to cause the apparatus to:
determine an identifier for the read command based at least in part on a second plurality of bits included in the set of bits.

16. The apparatus of claim 11, further comprising:
an array configured to store the read command and the QoS information for the read command; and
logic coupled with the array and the non-volatile memory and configured to prioritize communication of the read command to the non-volatile memory based at least in part on the QoS information for the read command, the logic configured to receive the read command and the QoS information for the read command from the array.

17. The apparatus of claim 11, further comprising:

an array configured to store the read command and the QoS information for the read command; and logic coupled with the array and the volatile memory and configured to prioritize communication of the read command to the volatile memory based at least in part on the QoS information for the read command, the logic configured to receive the read command and the QoS information for the read command from the array.

18. An apparatus, comprising:

a non-volatile memory;

a volatile memory configured to operate as a cache for the non-volatile memory; and an interface controller coupled with the non-volatile memory and the volatile memory, the interface controller operable to cause the apparatus to:

receive a set of bits from a host device during a set of clock cycles and over a command bus comprising a command select pin configured for double data rate signaling;

determine whether the set of bits represents a first command or metadata for a second command based at least in part on a state of the command select pin during at least one clock cycle of the set of clock cycles;

determine, based at least in part on the state of the command select pin indicating that the set of bits represents metadata for the second command and on a plurality of bits included in the set of bits, quality-of-service (QoS) information for a write command received over the command bus after the set of bits; and prioritize communication of the write command to the non-volatile memory or the volatile memory based at least in part on the QoS information for the write command.

19. The apparatus of claim 18, wherein the set of bits is decoded based at least in part on the state of the command select pin during at least one rising edge and one falling edge of the at least one clock cycle.

20. The apparatus of claim 18, wherein the interface controller is further operable to cause the apparatus to:

prioritize communication of the write command to the non-volatile memory or the volatile memory based at least in part on an amount of time the write command is queued at the interface controller.

* * * * *